US012284549B2

(12) United States Patent  
Yi et al.

(10) Patent No.: US 12,284,549 B2  
(45) Date of Patent: *Apr. 22, 2025

(54) TRIGGERING A BUFFER STATUS REPORT

(71) Applicant: Honor Device Co., Ltd., Guangdong (CN)

(72) Inventors: Yunjung Yi, Vienna, VA (US); Esmael Hejazi Dinan, McLean, VA (US); Hyukjin Chae, San Diego, CA (US); Ali Cagatay Cirik, Chantilly, VA (US); Hua Zhou, Vienna, VA (US)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,323

(22) Filed: Nov. 2, 2023

(65) Prior Publication Data

US 2024/0064562 A1 Feb. 22, 2024

Related U.S. Application Data

(63) Continuation of application No. 18/096,345, filed on Jan. 12, 2023, now Pat. No. 11,864,023, which is a continuation of application No. 17/089,657, filed on Nov. 4, 2020, now Pat. No. 11,558,773.

(60) Provisional application No. 62/932,084, filed on Nov. 7, 2019.

(51) Int. Cl.
*H04W 72/12* (2023.01)
*H04W 28/02* (2009.01)

(52) U.S. Cl.
CPC ....... *H04W 28/0278* (2013.01); *H04W 72/12* (2013.01)

(58) Field of Classification Search
CPC .......................... H04W 72/12; H04W 28/0278
USPC ......................................................... 370/329
See application file for complete search history.

(56) References Cited

PUBLICATIONS

3GPP TS 36.213 V15.5.0 (Mar. 2019) Release 15; UE Procedures related to Sidelink.
3GPP TS 36.321 V15.5.0 (Mar. 2019); Technical Specification; 3rd Generation Partnership Project; Technical Specification Group Radio Access Network; Evolved Universal Terrestrial Radio Access (E-UTRA); Medium Access Control (MAC) protocol specification; (Release 15).
3GPP TS 36.331 V15.5.1 (Apr. 2019); Technical Specification; 3rd Generation Partnership Project; Technical Specification Group Radio Access Network; Evolved Universal Terrestrial Radio Access (E-UTRA); Radio Resource Control (RRC); Protocol specification; (Release 15).
3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).

(Continued)

*Primary Examiner* — Angel T Brockman
(74) *Attorney, Agent, or Firm* — Conley Rose, P.C.

(57) ABSTRACT

A base station receives from a wireless device one or more first radio resource control messages indicating assistance information and in response transmits to the wireless device one or more second RRC messages indicating one or more configured grant configurations. The assistance information includes an identifier indicating a logical channel and one or more periodicities associated with the logical channel.

20 Claims, 30 Drawing Sheets

(56) References Cited

PUBLICATIONS

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

3GPP TSG RAN WG1 Meeting #98bis; Chongqing, China, Oct. 14-20, 2019; Title: RAN1 Chairman's Notes.

R1-19xxxxx; 3GPP TSG RAN WG1 #98bis; Chongqing, China, Oct. 14-20, 2019; Agenda item: 7.2.4; Source: LG Electronics; Title: Summary of RAN1 Agreements/Working assumptions in WI 5G V2X with NR sidelink; Document for: Information.

R2-1912168; 3GPP TSG-RAN WG2 Meeting #107bis; Chongqing, P.R. China, Oct. 14-18, 2019; Revision of R2-1908744; Source:CATT; Title: Leftover Issues for Sidelink Configured Grant; Agenda Item: 6.4.3; Document for: Discussion and Decision.

R2-1912173; 3GPP TSG-RAN WG2 Meeting #107bis; Chongqing, P. R. China, Oct. 14-18, 2019; Source: CATT; Title: Left Issues of BSR/SR; Agenda Item: 6.4.3; Document for: Discussion and Decision.

R2-1912175; 3GPP TSG-RAN WG2 Meeting #107bis; Chongqing, P.R. China, Oct. 14-18, 2019; Source: CATT; Title: Type 1 Sidelink Configured Grant Validity Time; Agenda Item: 6.4.3; Document for: Discussion and Decision.

R2-1912256; 3GPP TSG-RAN WG2 Meeting #107bis; Chongqing, China, Oct. 14-18, 2019; Source: vivo; Title: Discussion on SR and BSR; Agenda Item: 6.4.3; Document for: Discussion and Decision.

R2-1912257; 3GPP TSG-RAN WG2 Meeting #107bis; Chongqing, China, Oct. 14-18, 2019; (Revision of R2-1910227); Source: vivo; Title: Discussion on Truncated Sidelink BSR; Agenda Item: 6.4.3; Document for: Discussion and Decision.

R2-1912258; 3GPP TSG-RAN WG2 Meeting #107bis; Chongqing, China, Oct. 14-18, 2019; Revision of R2-1910211; Source: vivo; Title: Remaining issues on sidelink configured grant; Agenda Item: 6.4.3; Document for: Discussion and Decision.

R2-1912379; 3GPP TSG RAN WG2 Meeting #107bis; Chongqing, China, Oct. 14-18, 2019; Title: Consideration on mode1 resource allocation; Source: ZTE Corporation, Sanechips; Agenda item: 6.4.3; Document for: Discussion and Approval.

R2-1912434; 3GPP TSG-RAN2 107bis; Chongqing, China, Oct. 14-Oct. 18, 2019; Agenda item: 6.4.3; Source: Samsung; Title: Impact of Mode 1 Resource Allocation on Uu BWP Operation; Document for: Discussion & Decision.

R2-1912650; 3GPP TSG RAN WG2 Meeting #107bis; Chongqing, China, Oct. 14-18, 2019; Agenda item: 6.4.3; Source: Fraunhofer HHI, Fraunhofer IIS; Title: Resource Pool Sharing between Mode 1 and Mode 2 UEs; Document for: Discussion and Decision.

R2-1912687; 3GPP TSG-RAN WG2 Meeting #107bis; Chongqing, China, Oct. 14-18, 2019; Agenda Item: 6.4.3; Source: Lenovo, Motorola Mobility; Title: SR trigger for NR SL; Document for: Discussion and Decision.

R2-1912806; 3GPP TSG-RAN WG2 Meeting #107bis; Chongqing, China, Oct. 14-18, 2019; Agenda Item:6.4.3; Source: Xiaomi; Title: Discussion on BSR prioritization; Document for: Discussion.

R2-1912872; 3GPP RAN WG2 Meeting #107bis; Chongqing, China, Oct. 14-18, 2019; (Revision of R2-1909587); Agenda Item: 6.4.3; Source: InterDigital Inc.; Title: Multiple SL Configured Grants and UE Assistance Information; Document for: Discussion, Decision.

R2-1913164; 3GPP TSG-RAN WG2 Meeting #107bis; Chongqing, China, Oct. 14-18, 2019; Resubmission of R2-1909995; Source: Fujitsu; Title: Discussion on sidelink SR trigger; Agenda Item: 6.4.3; Document for: Discussion and decision.

R2-1913237; 3GPP TSG-RAN WG2 Meeting #107Bis; Chongqing, China, Oct. 14-18, 2019; Revision of R2-1911128; Agenda Item: 6.4.3; Source: MediaTek Inc.; Title: On SL configured grant; Document for: Discussion and decision.

R2-1913325; 3GPP TSG-RAN WG2 #107bis; Chongqing, China, Oct. 14-18, 2019; Agenda Item: 6.4.3; Source: Ericsson; Title: Discussion on SL Mode 1 left issues; Document for: Discussion, Decision.

R2-1913495; 3GPP TSG-RAN WG2 Meeting #107bis; Chongqing, China, Oct. 14-18, 2019; Agenda Item: 6.4.3; Source: Apple, OPPO; Title: Discussion on prioritization between SL BSR and UL BSR; Document for: Discussion, Decision.

R2-1913511; 3GPP TSG RAN WG2 #107bis; Chongqing, CN, Oct. 14-18, 2019; Agenda Item: 6.4.3; Source: Qualcomm Incorporated; Title: Discussion on mode 1 resource allocation; Document for: Discussion, Decision.

R2-1913702; 3GPP TSG-RAN WG2#107bis; Chongqing, China, Oct. 14-Oct. 18, 2019 (Revision of R2-1911072); Agenda Item: 6.4.3; Source: Huawei, HiSilicon; Title: Discussion on Sidelink Configured Grant support; Document for: Discussion and decision.

R2-1913707; 3GPP TSG-RAN WG2 # 107bis; ChongQing, China, Oct. 14-Oct. 18, 2019; Agenda Item: 6.4.3; Source: Huawei, HiSilicon; Title: Discussion on remaining issues of SR and BSR for SL Mode 1; Document for: Discussion and decision.

R2-1913769; 3GPP TSG-RAN WG2 Meeting #107bis; Chongqing, China, Oct. 14-18, 2019; Resubmission of R2-1911223; Agenda Item: 6.4.3; Source: ASUSTeK; Title: Discussion on resource allocation for sidelink HARQ ACK/NACK report; Document for: Discussion and Decision.

R2-1913781; 3GPP TSG RAN WG2 Meeting #107bis; Chongqing, China, Oct. 14-18, 2019; Xi'an, China, Apr. 8-Apr. 12, 2019; Agenda item: 6.4.3; Source: LG Electronics Inc.; Title: Discussion on remaining issues of mode 1 operation; Document for: Discussion and Decision.

R2-1913868; 3GPP TSG-RAN WG2 Meeting #107bis; Chongqing, China, Oct. 14-18, 2019; (Resubmission of R2-1911411); Agenda item: 6.4.3; Source: ITL; Title: Sidelink HARQ retransmission in mode 1; Document for: Discussion and Decision.

R2-1914138; 3GPP TSG-RAN WG2 Meeting #107bis; Chongqing, China, Oct. 14-18, 2019; Agenda Item: 7.8.8; Source: Session Chair (Samsung); Title: Report from session on LTE V2X and NR V2X; Document for: Approval.

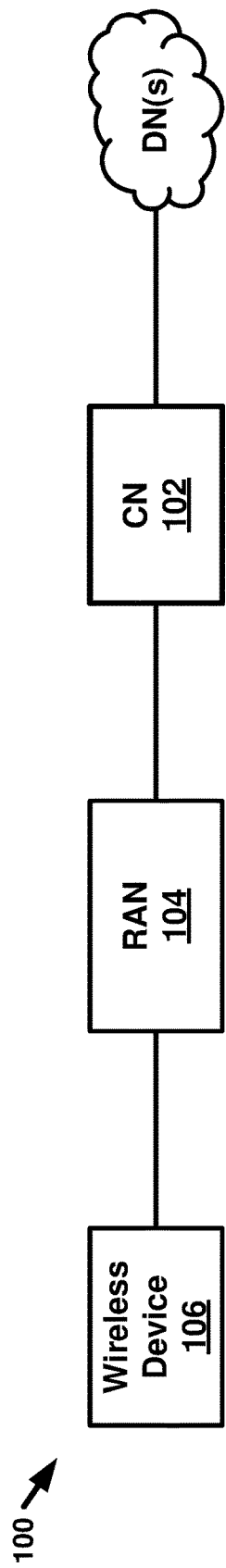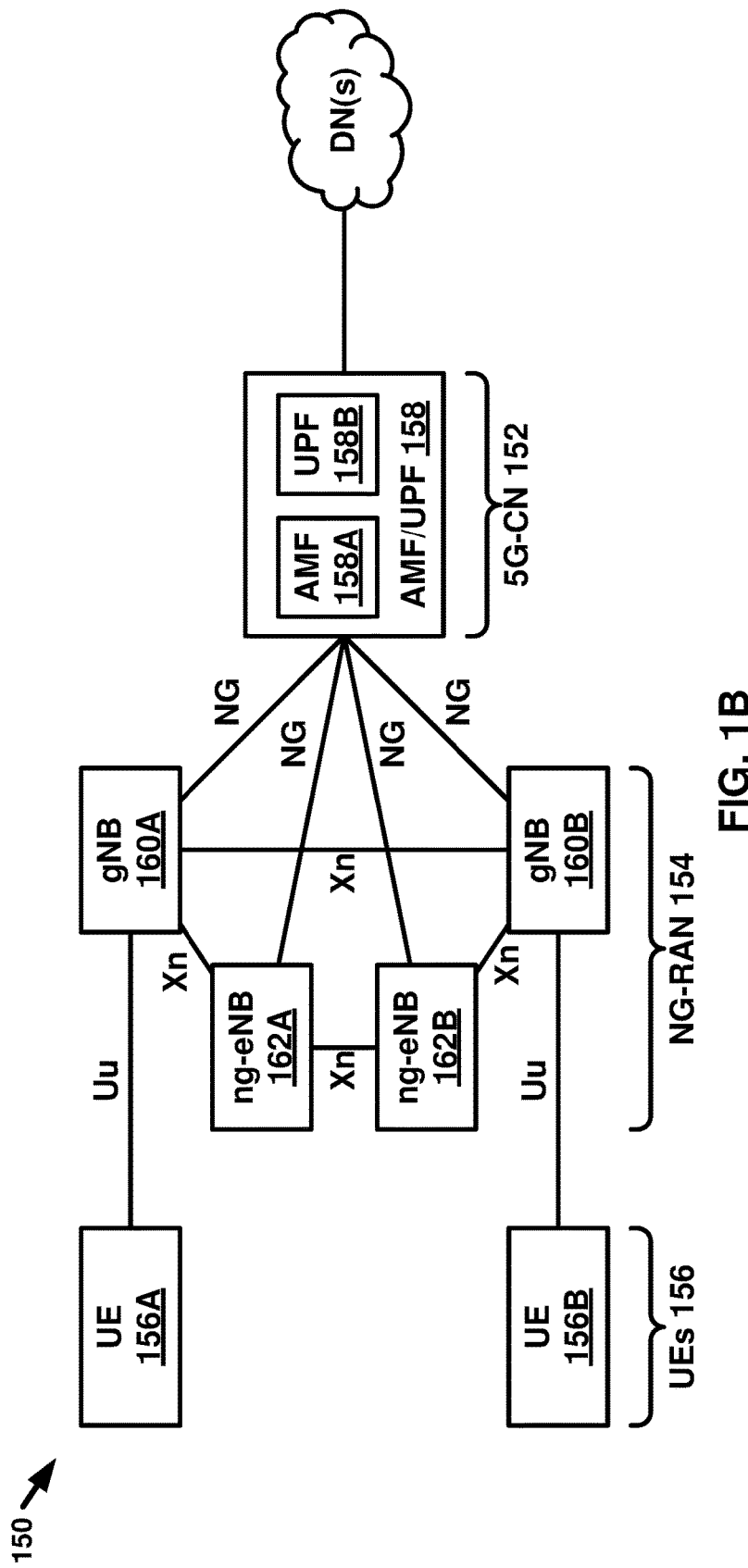

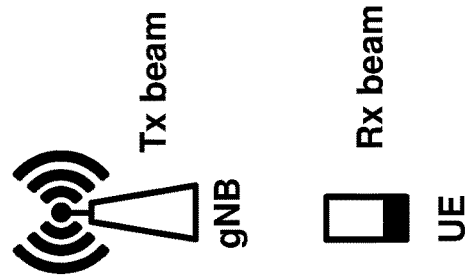
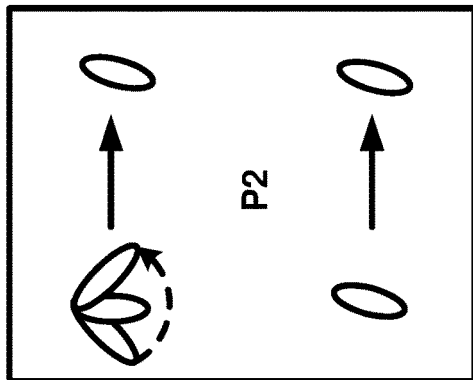
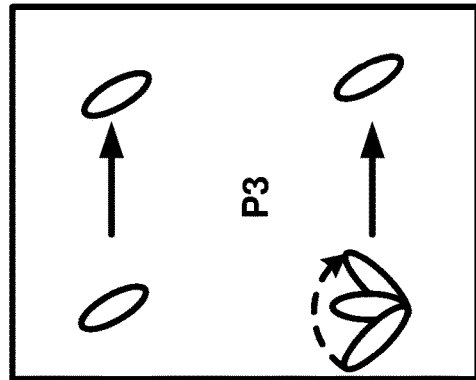
FIG. 12A
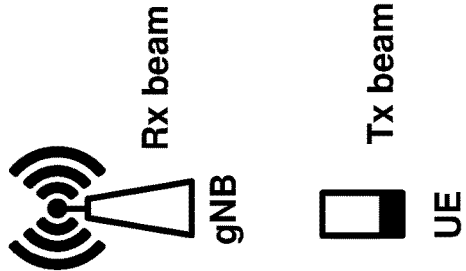
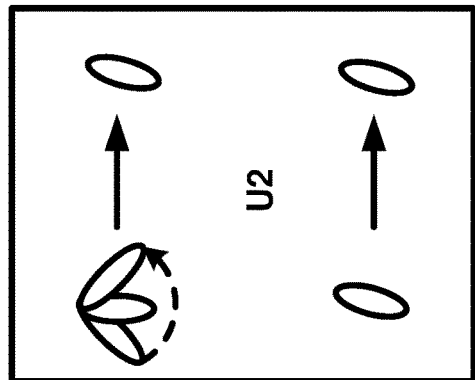
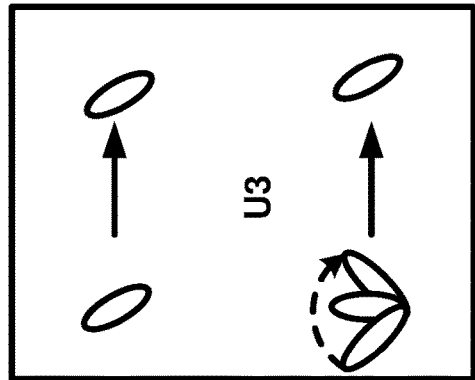
FIG. 12B

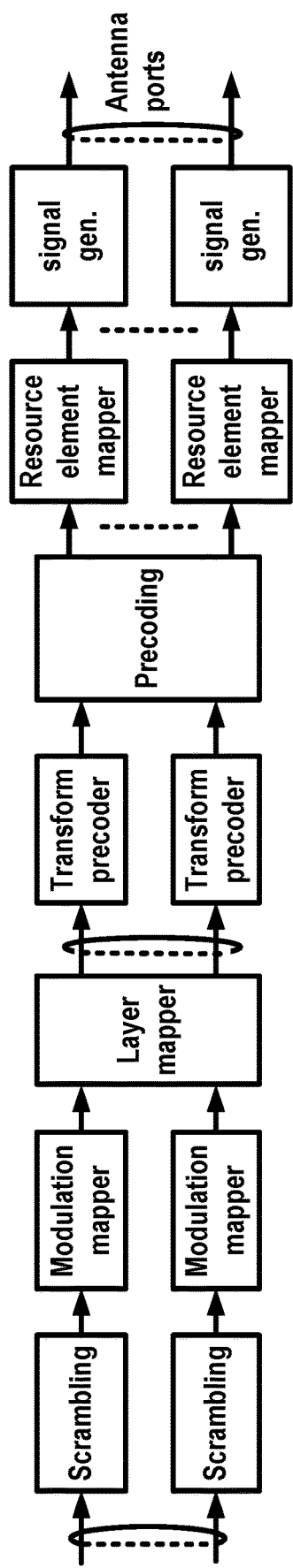
FIG. 16A
FIG. 16B
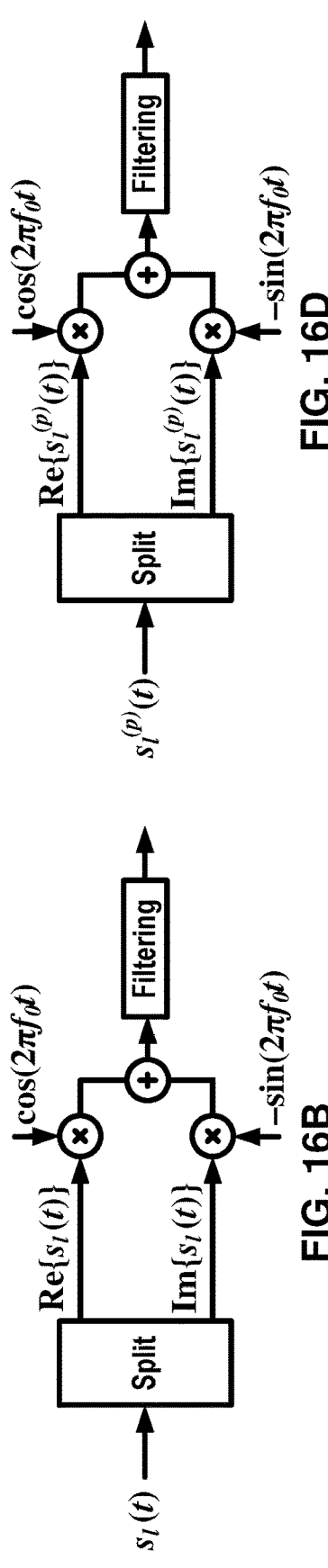
FIG. 16D
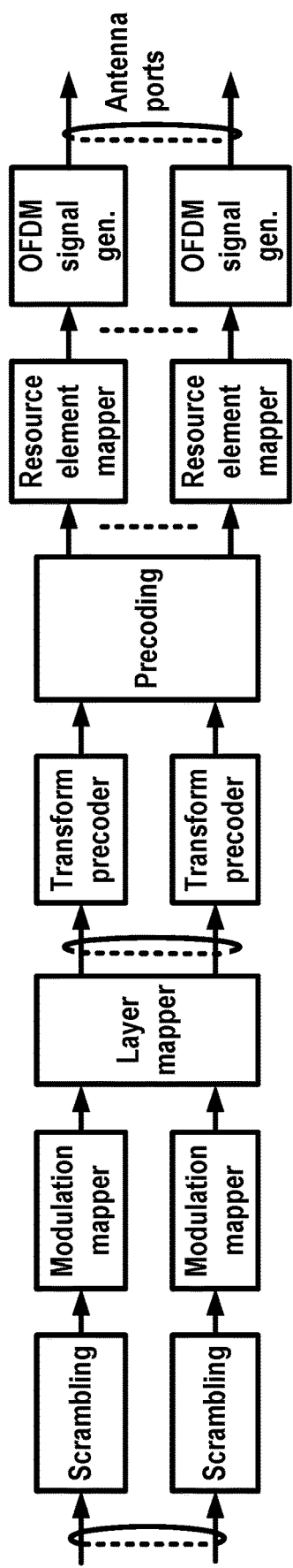
FIG. 16C

```
UEAssistanceInformation-SL ::=   SEQUENCE {
    SL-AssistanceInformation         SEQUENCE {
        trafficPatternInfoListSL         TrafficPatternInfoList
    }  OPTIONAL,
    nonCriticalExtension             SEQUENCE {}                          OPTIONAL
}

TrafficPatternInfo ::= SEQUENCE {
    trafficPeriodicity               ENUMERATED {
        ms2, ms4, ms8, ms20, ms40, ms100, ms200, ms1000, ...},
    timingOffset                     INTEGER (0..10239),
    priorityInfoSL                   SL-Priority                          OPTIONAL,
    logicalChannelIdentityUL         INTEGER (3..10)                      OPTIONAL,
    messageSize                      BIT STRING (SIZE (6))
    trafficDestination               SL-DestinationIdentity               OPTIONAL,
    reliabilityInfoSL                SL-Reliability                       OPTIONAL,
    latencyInfoSL                    SL-Latency                           OPTIONAL,
                                     INTEGER (0..31)
    modulationIndex                  INTEGER (0..31)
    nominal buffer size level
}  OPTIONAL,
    trafficType                      ENUMERATED{periodic, aperiodic,
reserved}                                                                 OPTIONAL,
    cast type                        ENUMERATED (unicast, groupcast,
broadcast}                                                                OPTIONAL,
}
```

FIG. 29

Transmit radio resource control message(s) indicating assistance information for a sidelink operation, wherein the assistant information indicates an identifier indicating a logical channel associated with a sidelink traffic; and one or more periodicities associated with the logical channel
3010

Receive, in response to the assistance information, one or more second RRC messages indicating one or more configured grant configurations determined based on the one or more of periodicities of the logical channel
3020

Trigger a transmission of a buffer status report in response to sidelink data of the logical channel becoming available; and Transmit a scheduling request (SR)
3030

In response to the SR:
cancel the transmission of the buffer status report; and receive one or more activation commands indicating activation of the one or more configured grant configurations
3040

FIG. 30

TRIGGERING A BUFFER STATUS REPORT

CROSS-REFERENCE TO RELATED APPLICATIONS

This application is a continuation of U.S. patent application Ser. No. 18/096,345, filed Jan. 12, 2023, which is a continuation of U.S. patent application Ser. No. 17/089,657, filed Nov. 4, 2020, which claims the benefit of U.S. Provisional Application No. 62/932,084, filed Nov. 7, 2019, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 29 is an illustration of an aspect of an example embodiment of the present disclosure.

FIG. 30 is a flow diagram of an aspect of an example embodiment of the present disclosure.

DETAILED DESCRIPTION

Figure 2A:
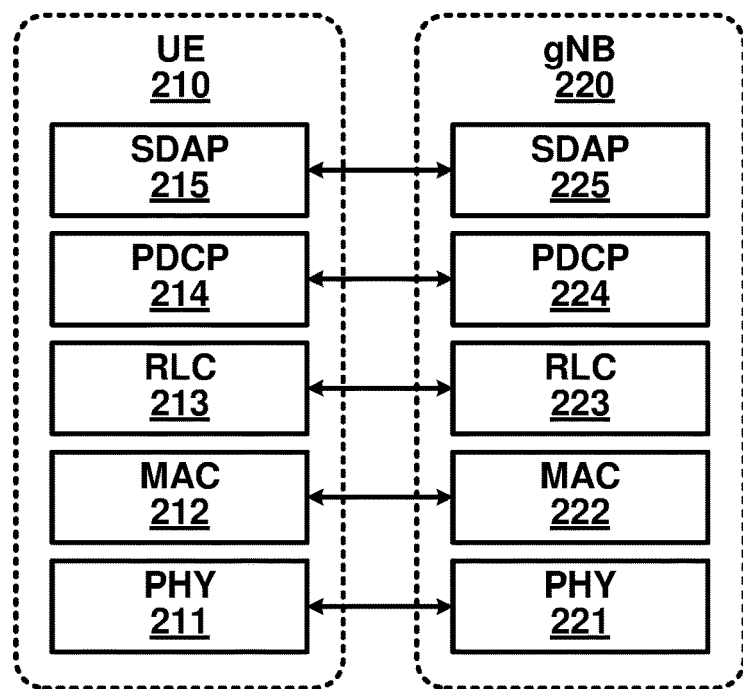
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
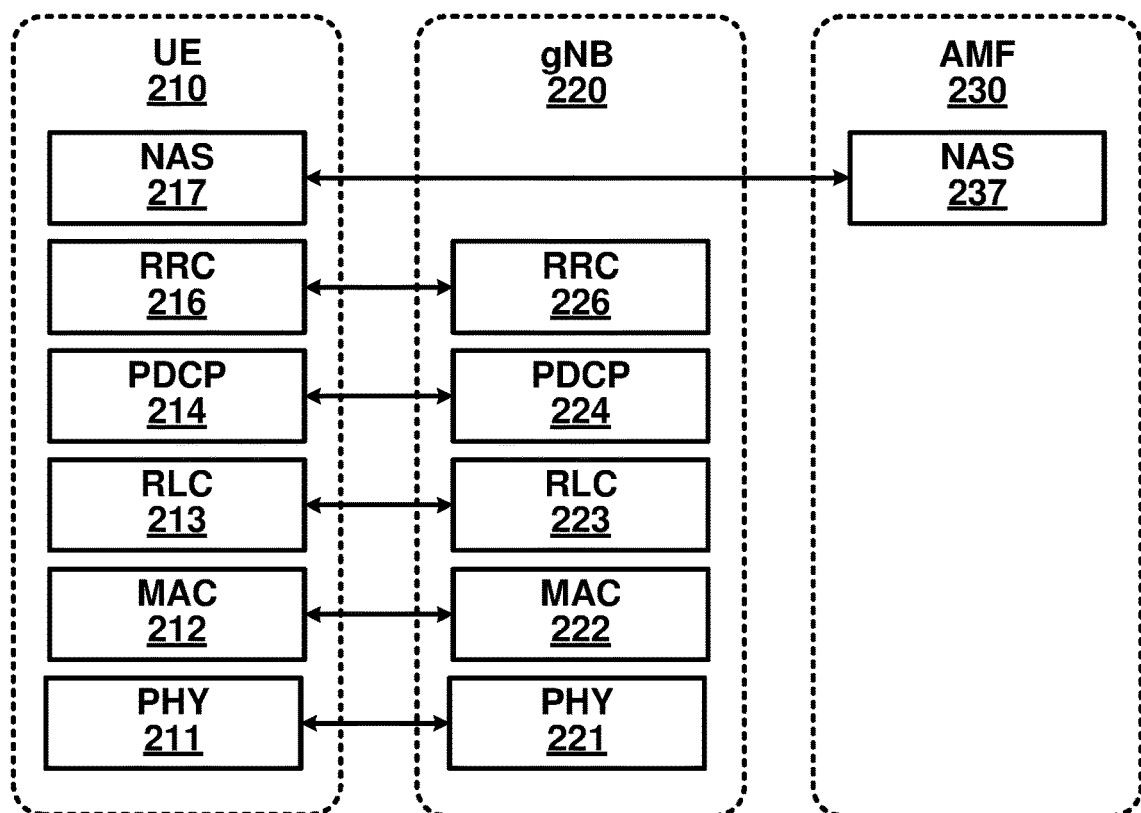

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
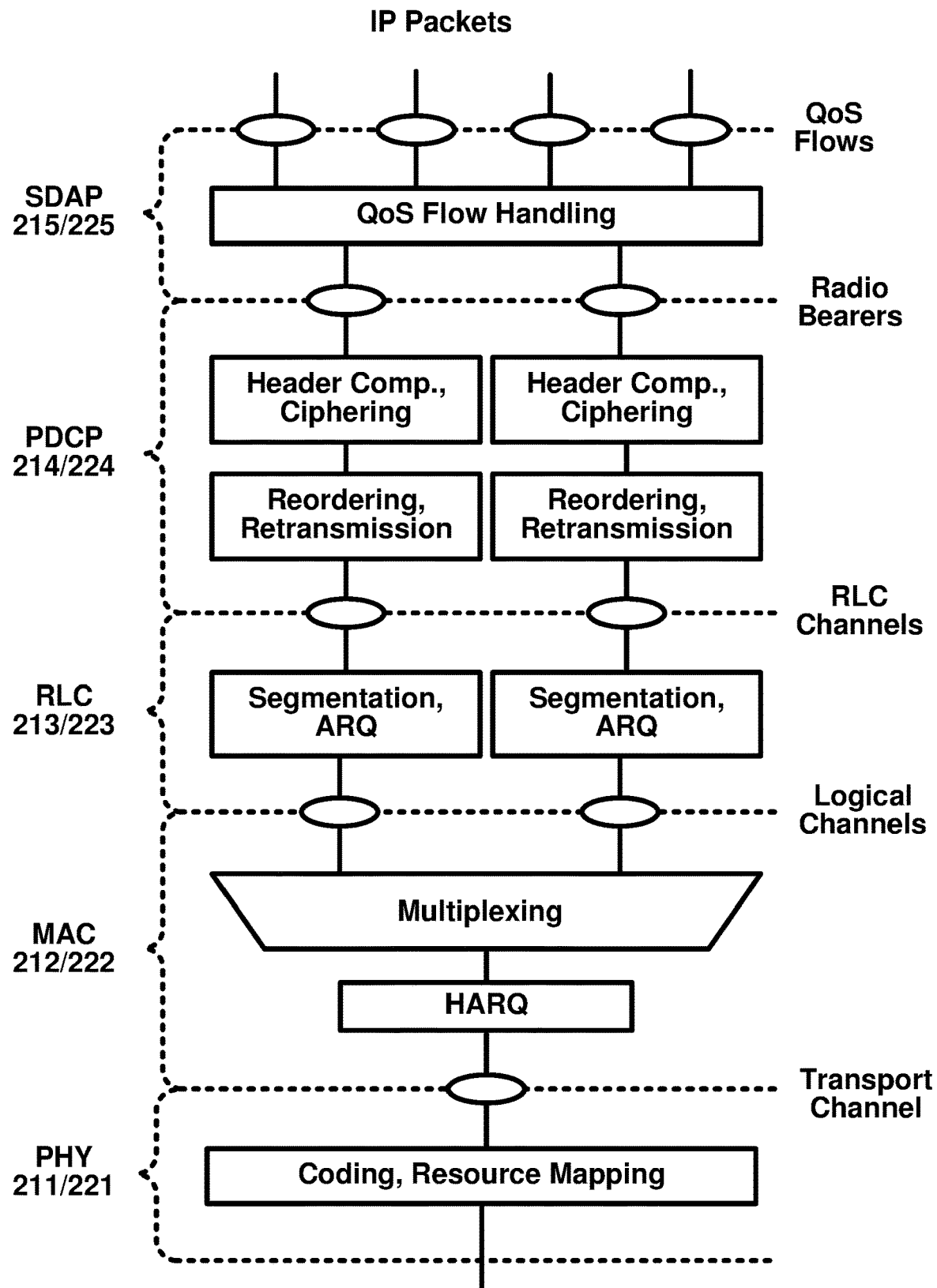
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
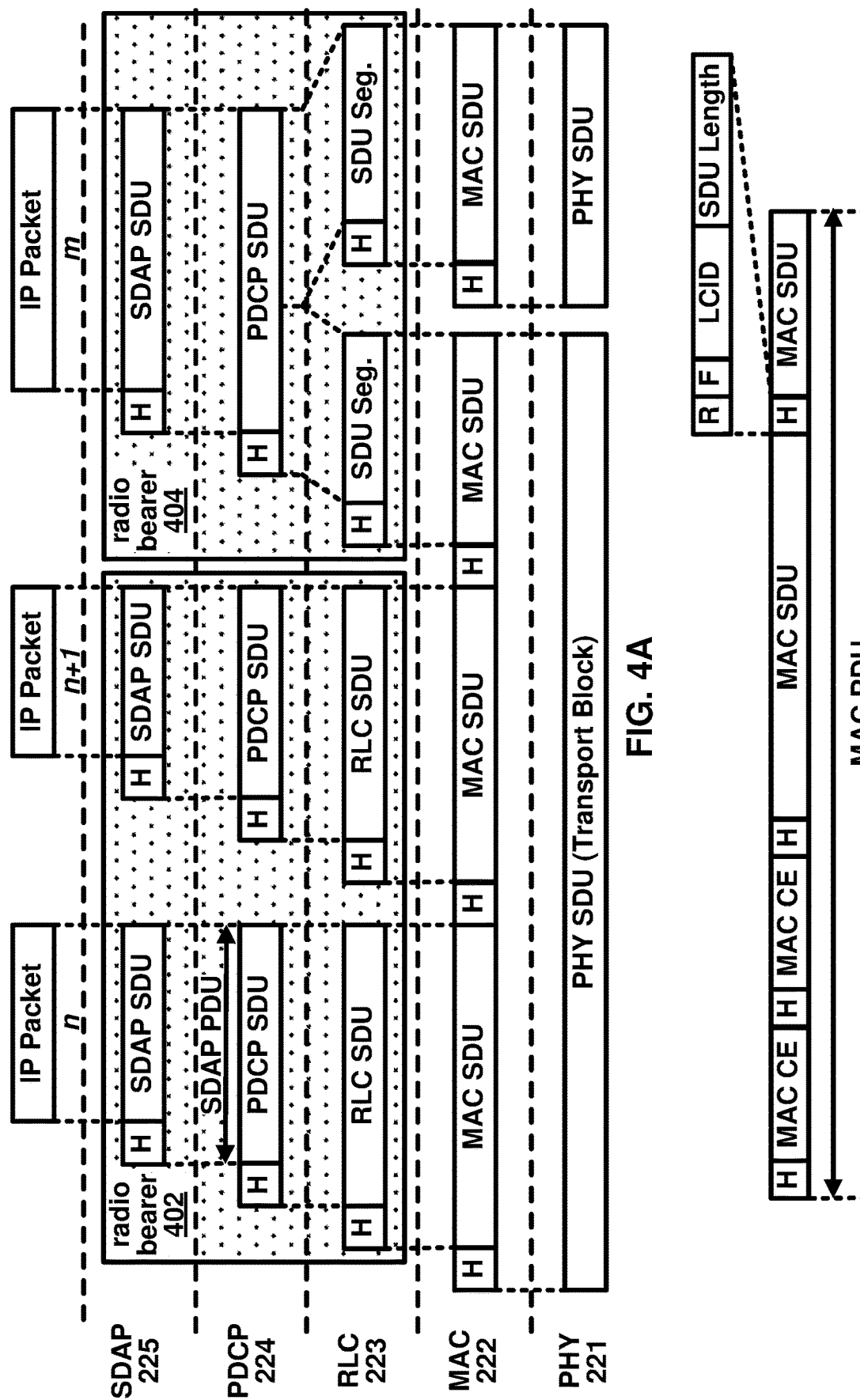
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
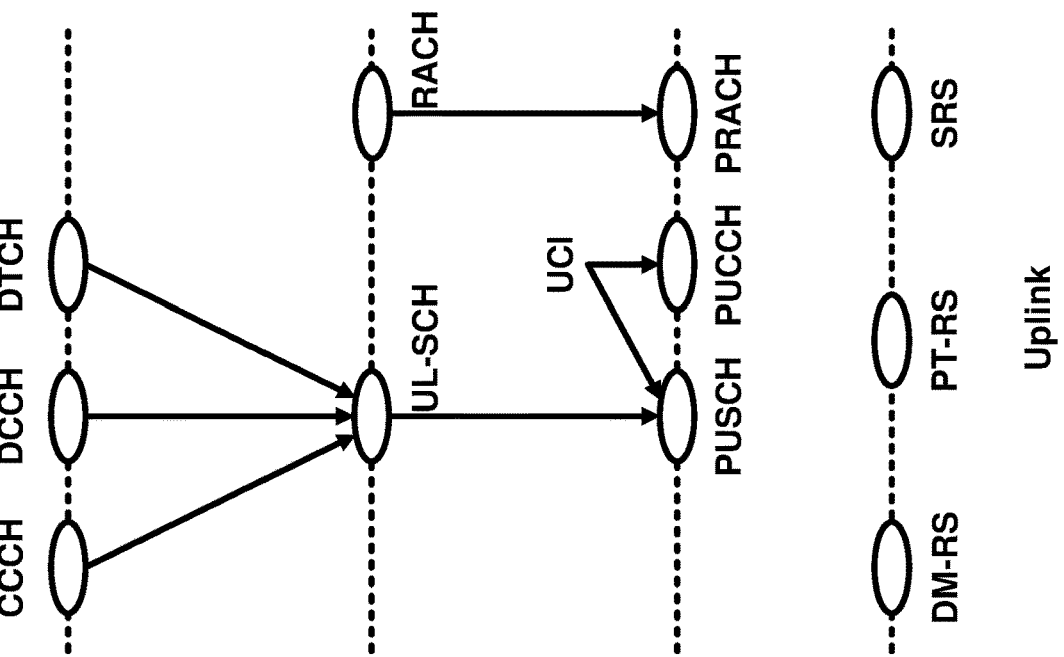
FIG. 5A and FIG. 5B respectively illustrate a mapping between logical channels, transport channels, and physical channels for the downlink and uplink.
Figure 5A:
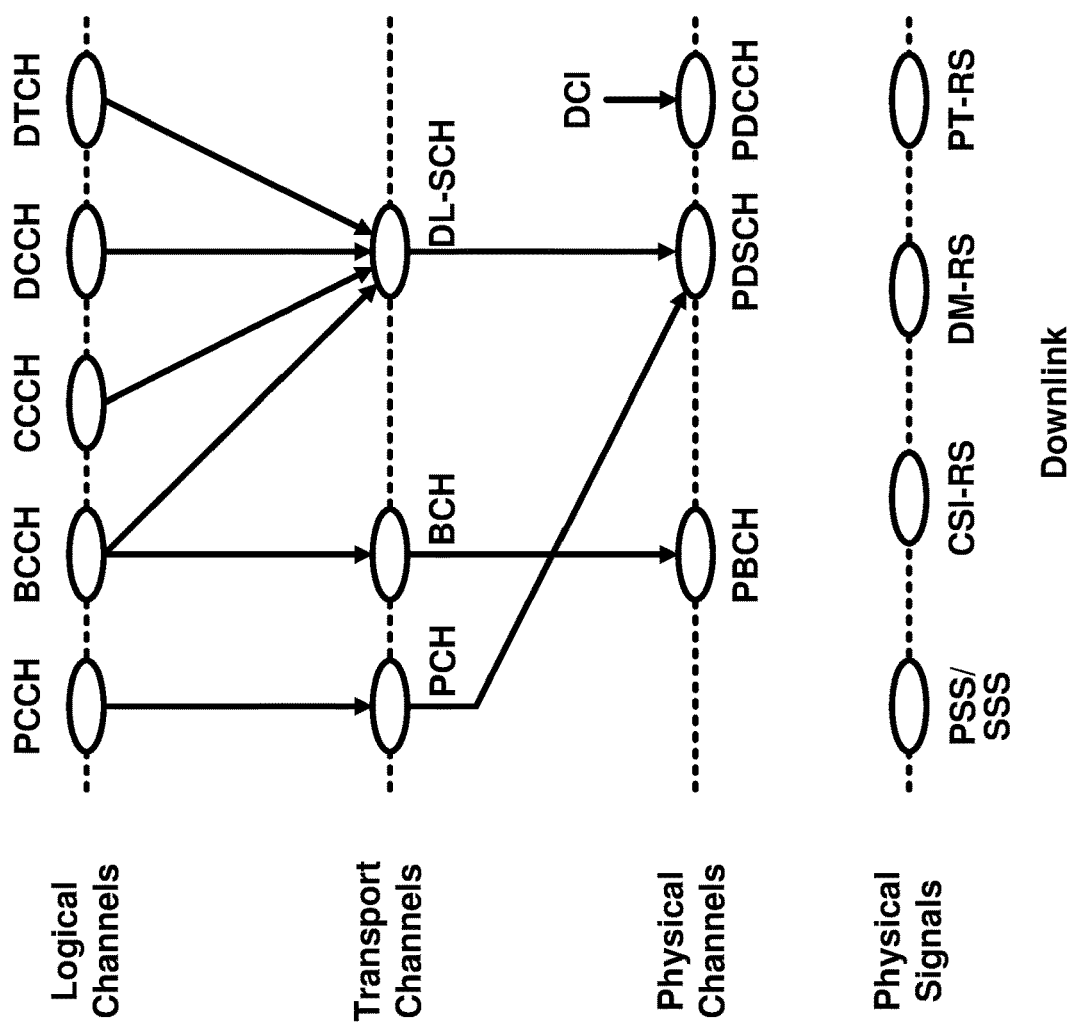

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
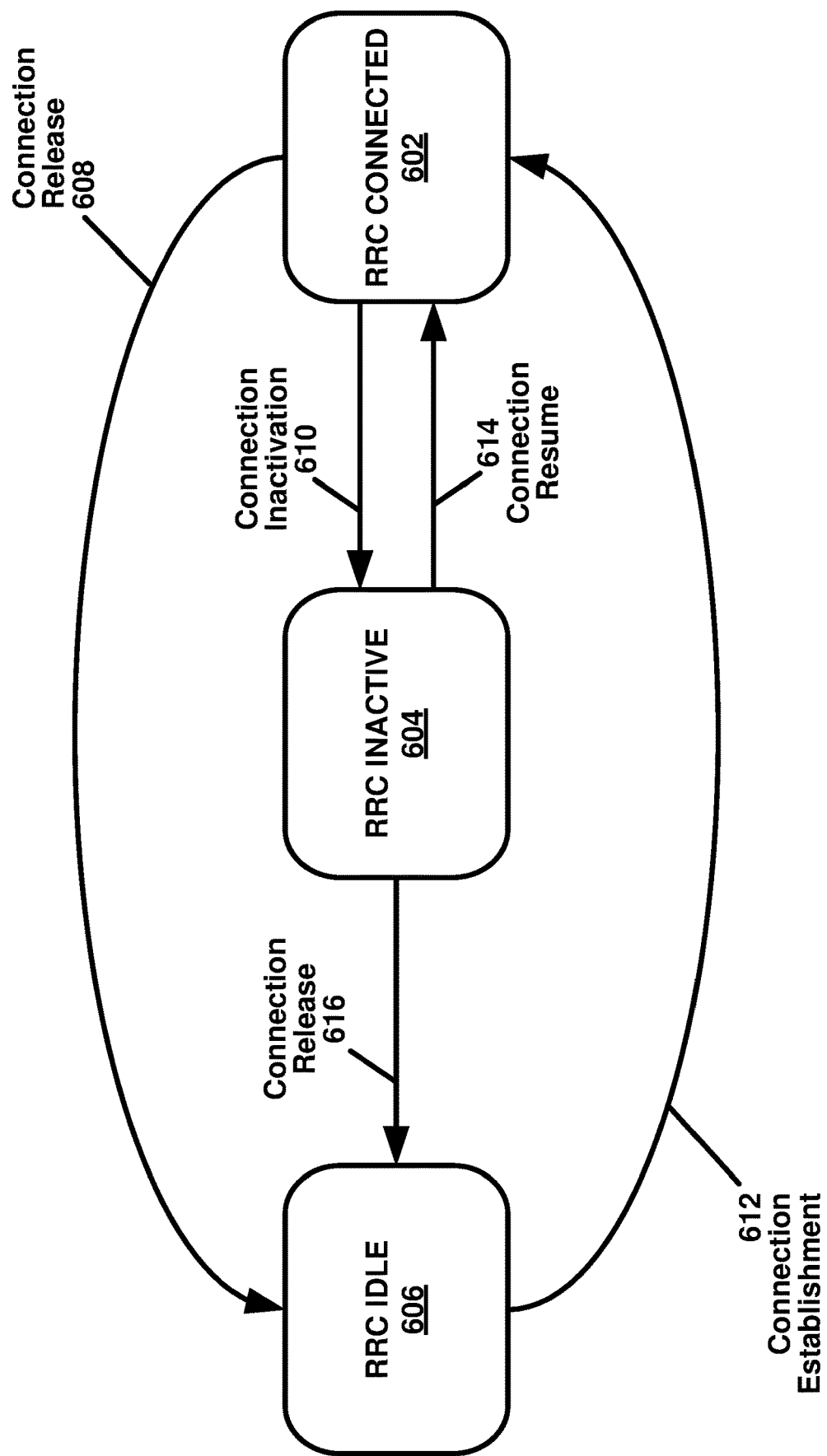
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
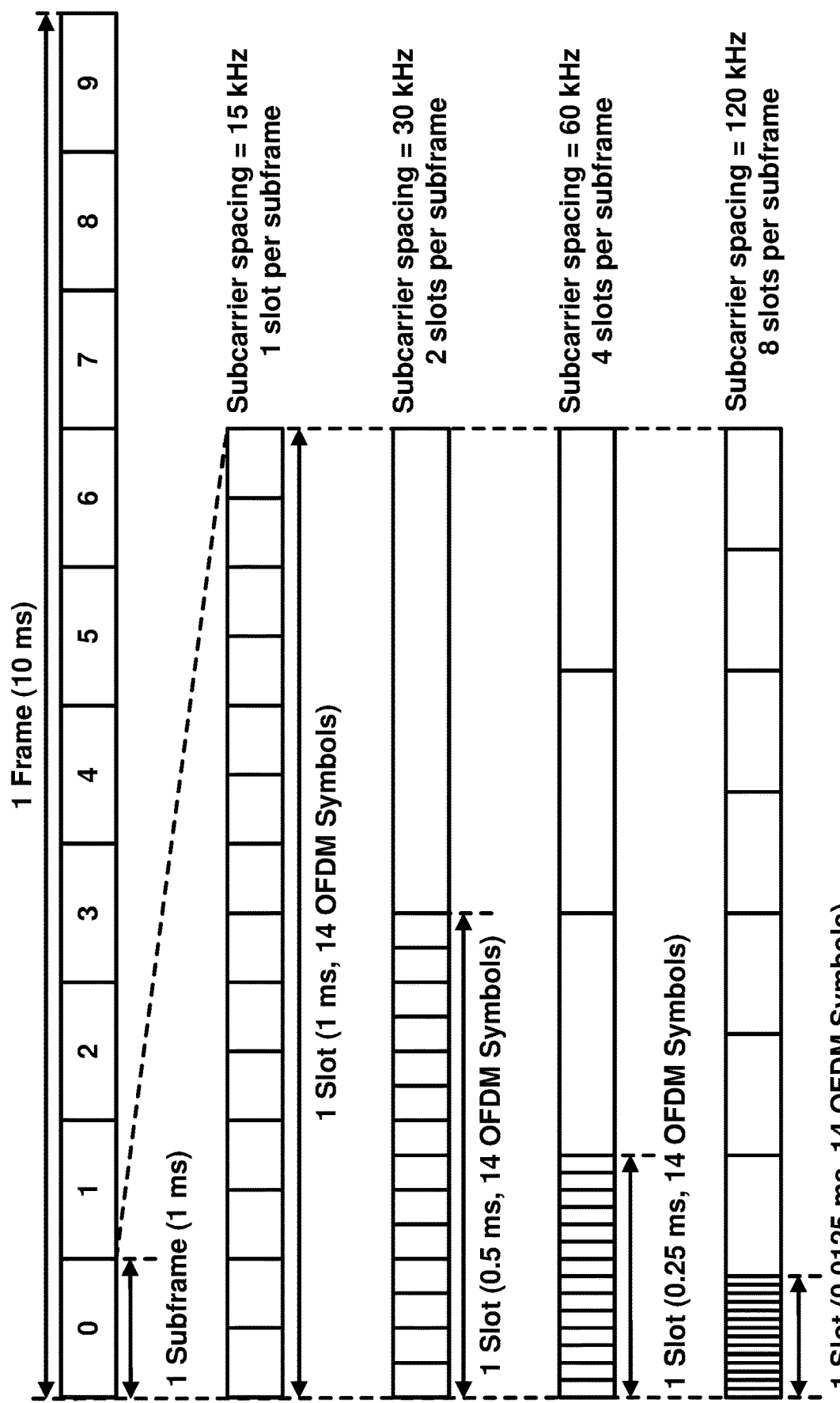
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
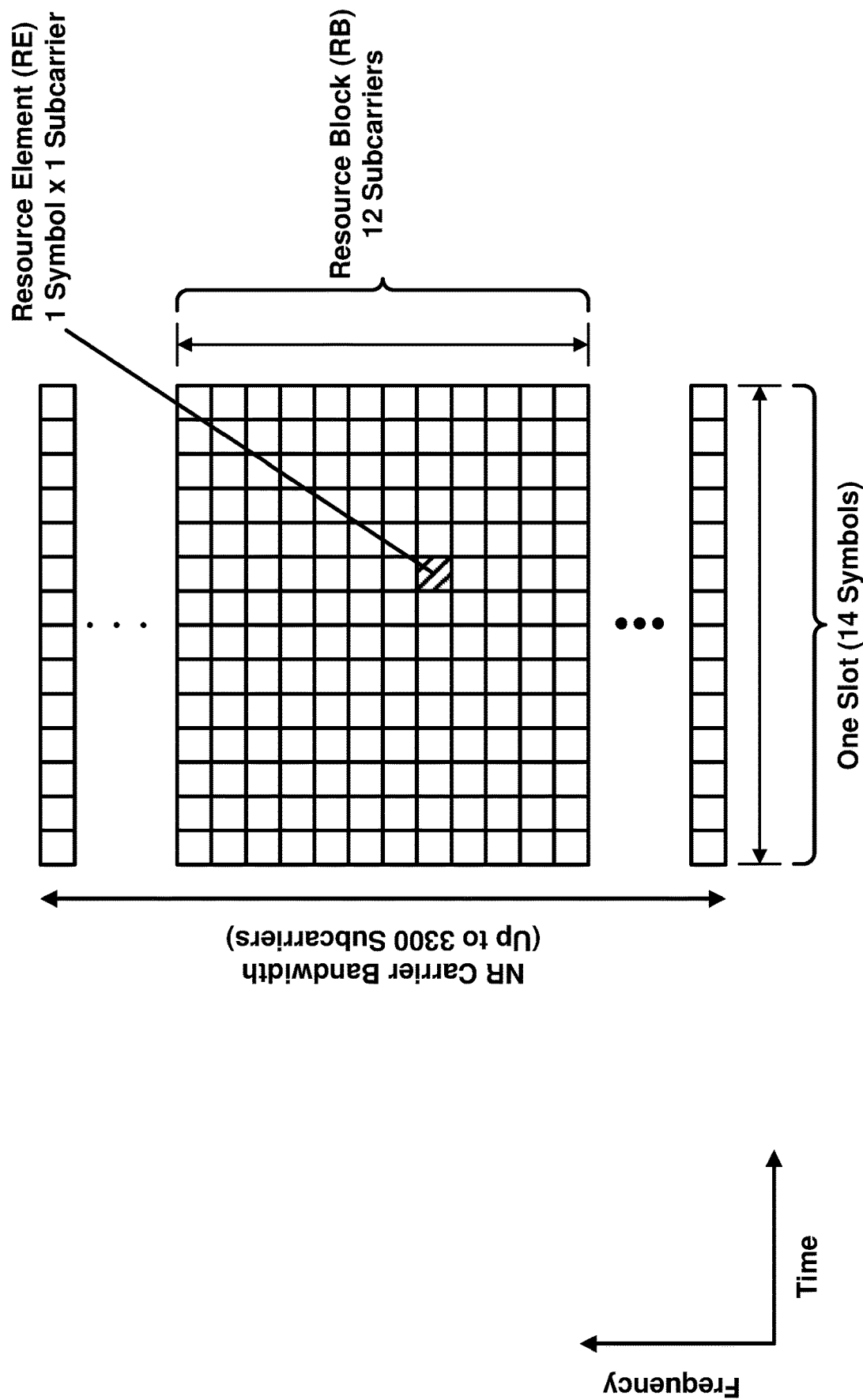
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
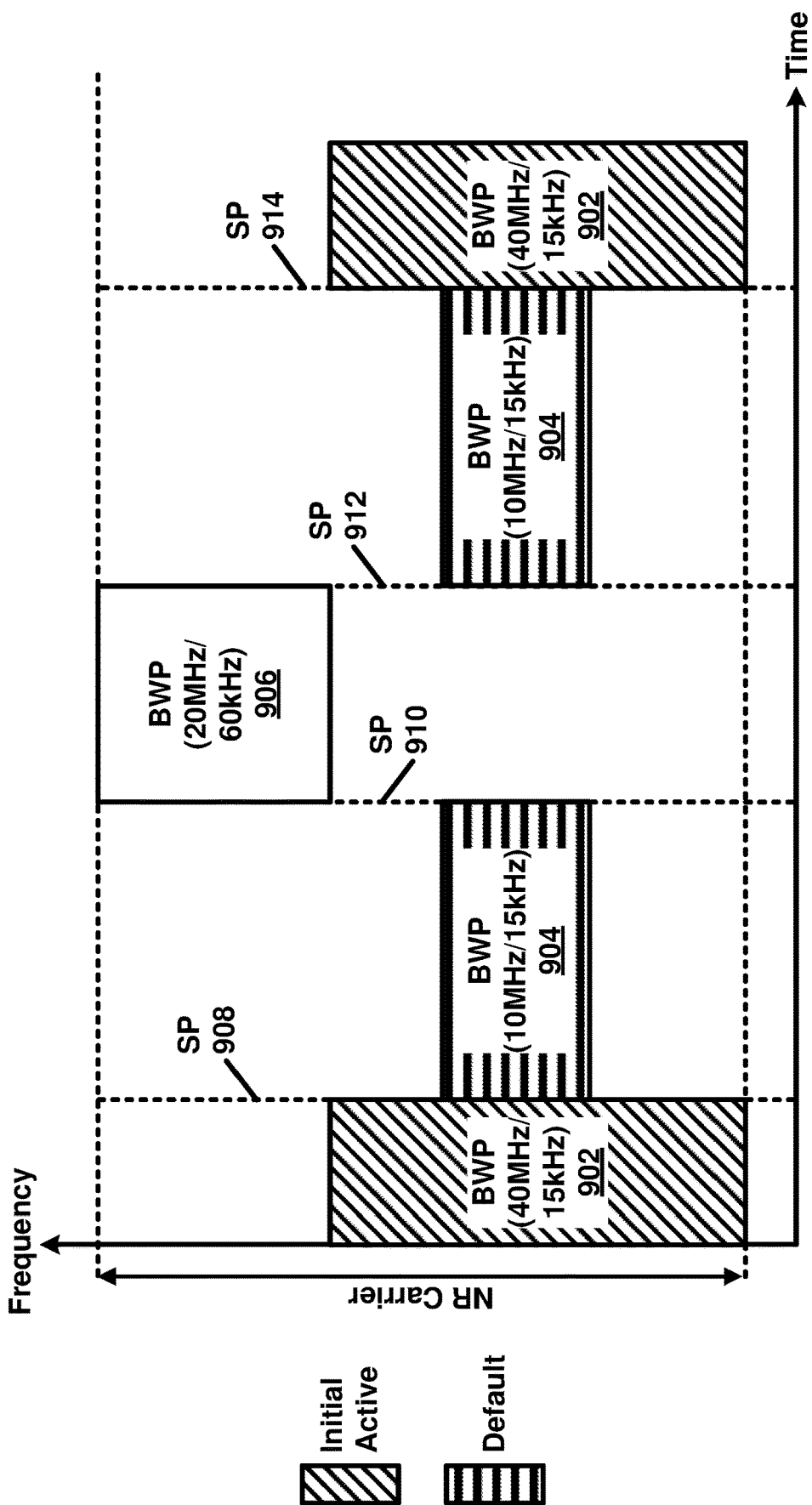
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
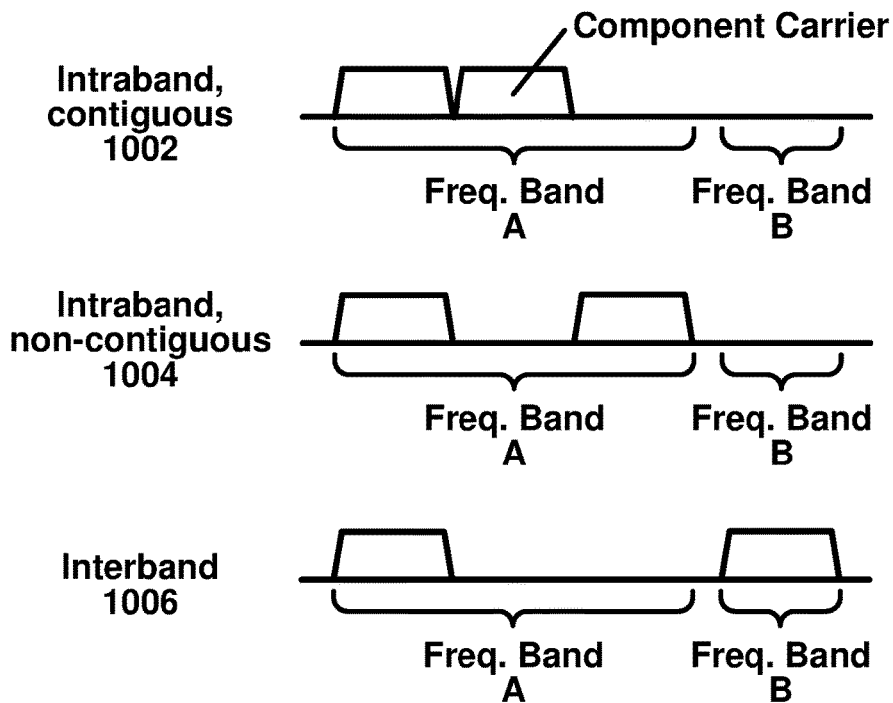
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
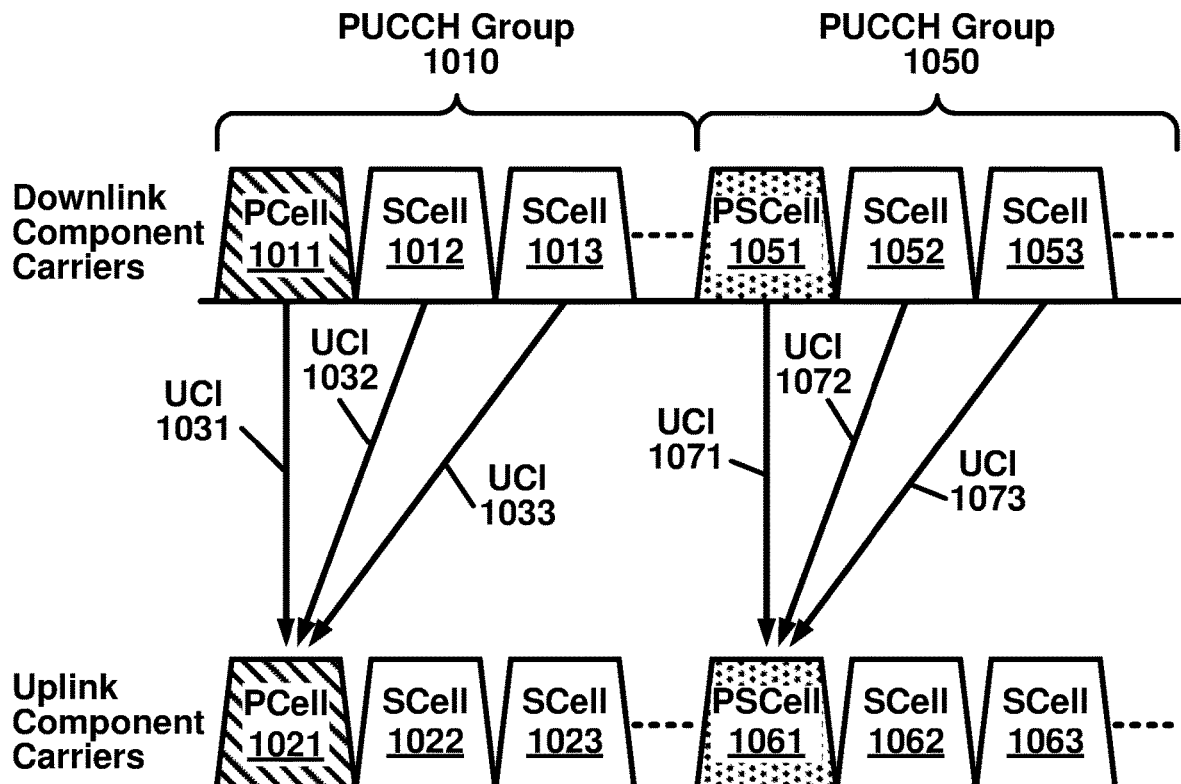
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell 1011, an Scell 1012, and an Scell 1013. The PUCCH group 1050 includes three downlink CCs in the present example: a Pcell 1051, an Scell 1052, and an Scell 1053. One or more uplink CCs may be configured as a Pcell 1021, an Scell 1022, and an Scell 1023. One or more other uplink CCs may be configured as a primary Scell (PSCell) 1061, an Scell 1062, and an Scell 1063. Uplink control information (UCI) related to the downlink CCs of the PUCCH group 1010, shown as UCI 1031, UCI 1032, and UCI 1033, may be transmitted in the uplink of the Pcell 1021. Uplink control information (UCI) related to the downlink CCs of the PUCCH group 1050, shown as UCI 1071, UCI 1072, and UCI 1073, may be transmitted in the uplink of the PScell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell 1021 and the PScell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
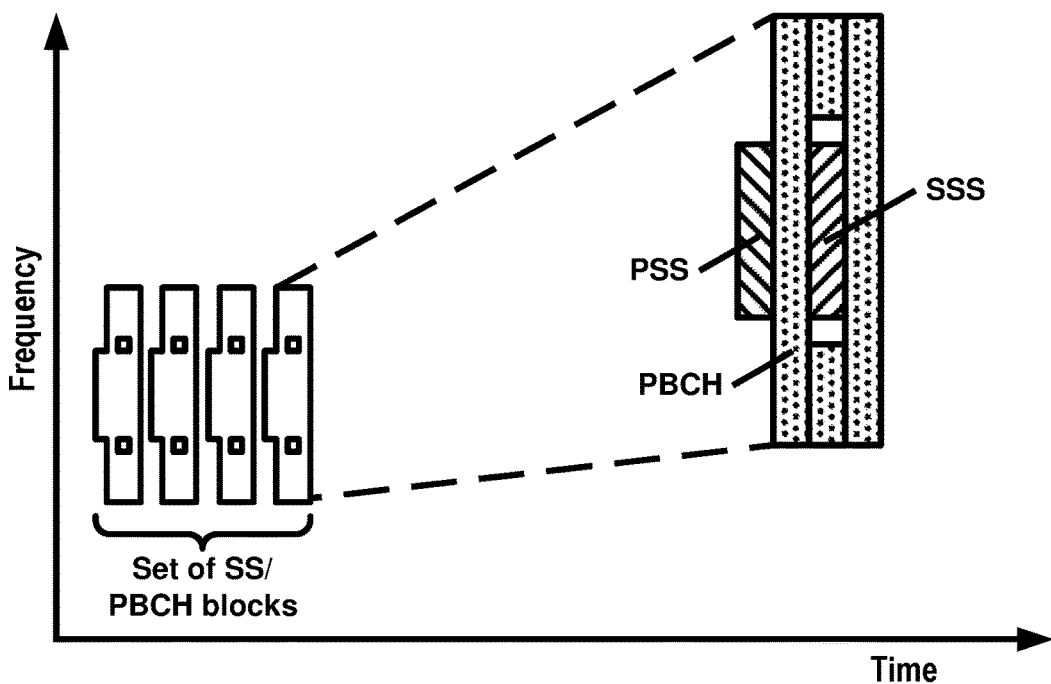
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
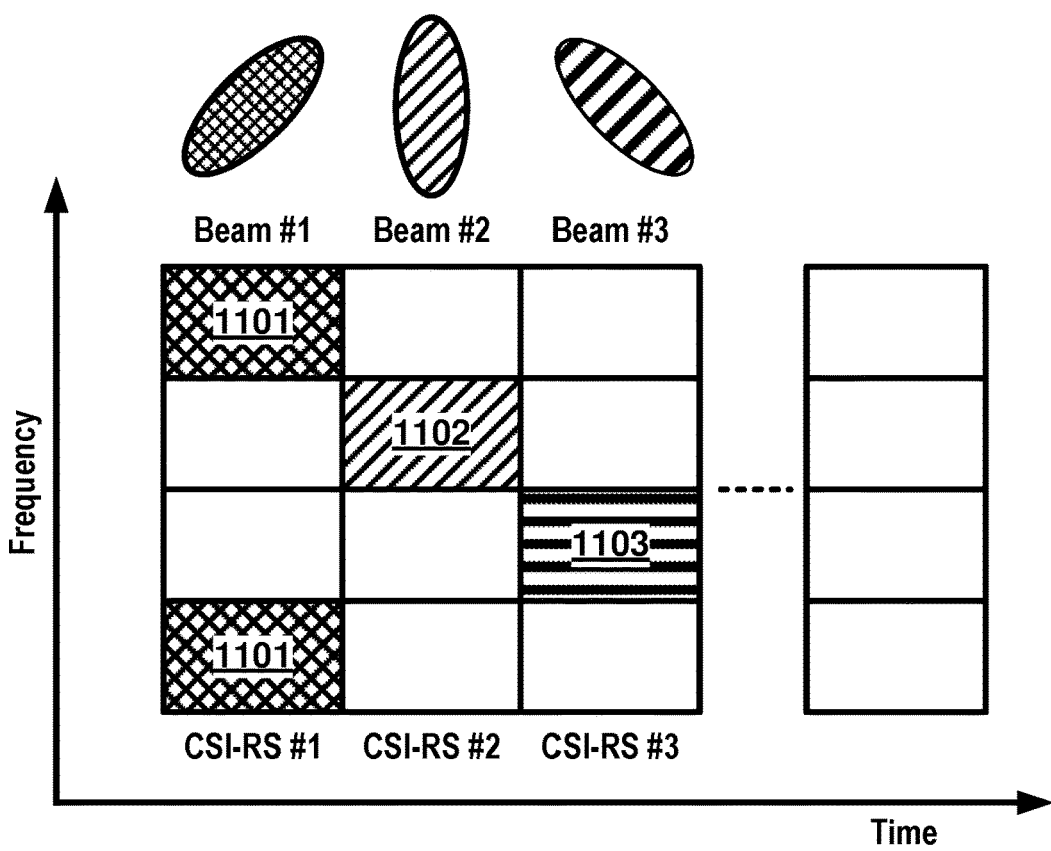
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
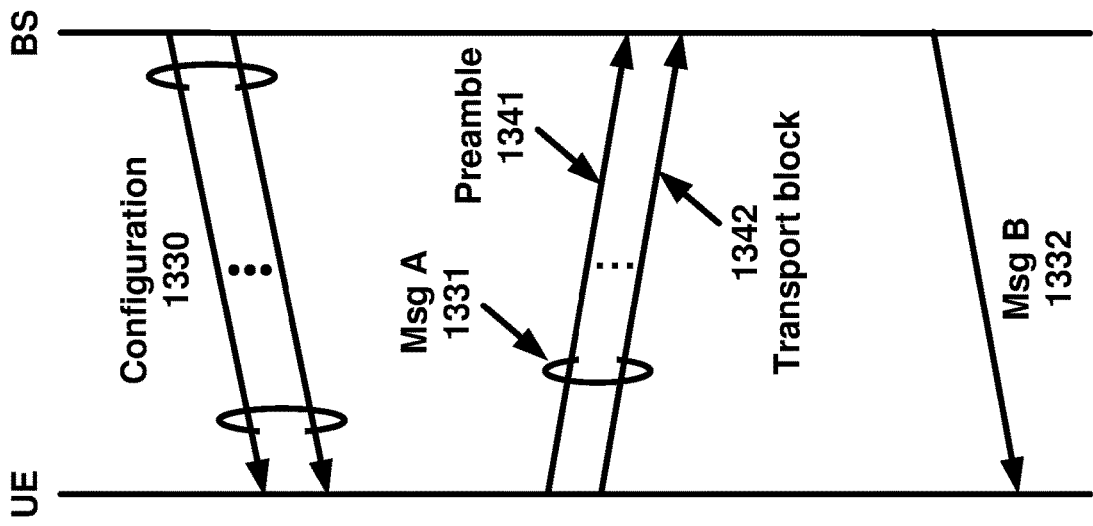
FIG. 13A, FIG. 13B, and FIG. 13C respectively illustrate a four-step contention-based random access procedure, a two-step contention-free random access procedure, and another two-step random access procedure.
Figure 13B:
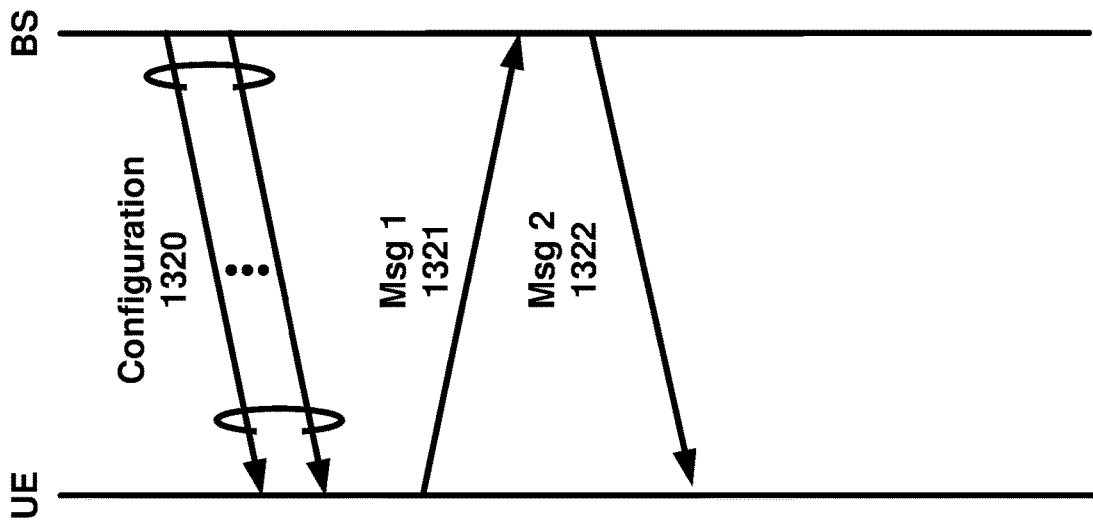
Figure 13A:
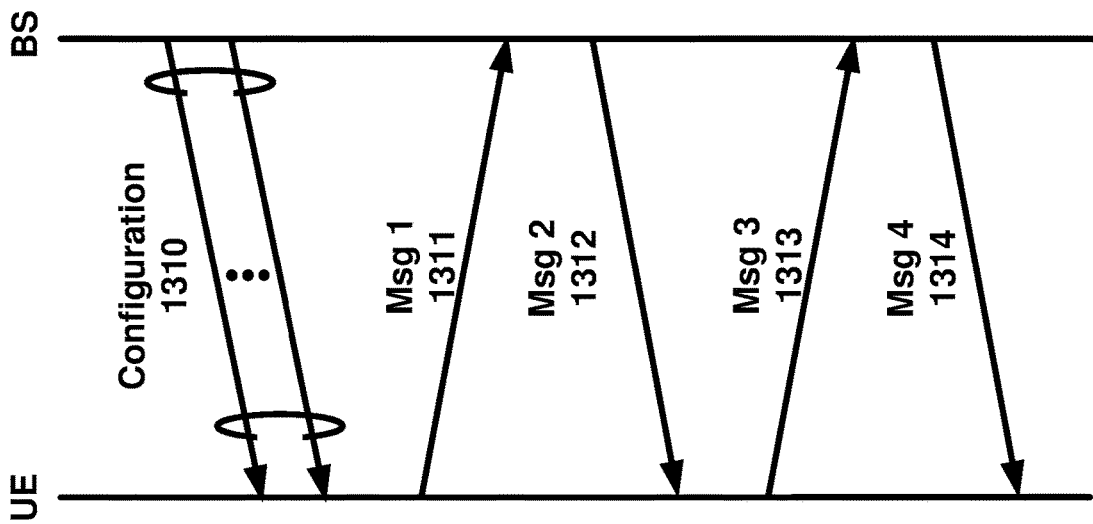

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows: RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), fid may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
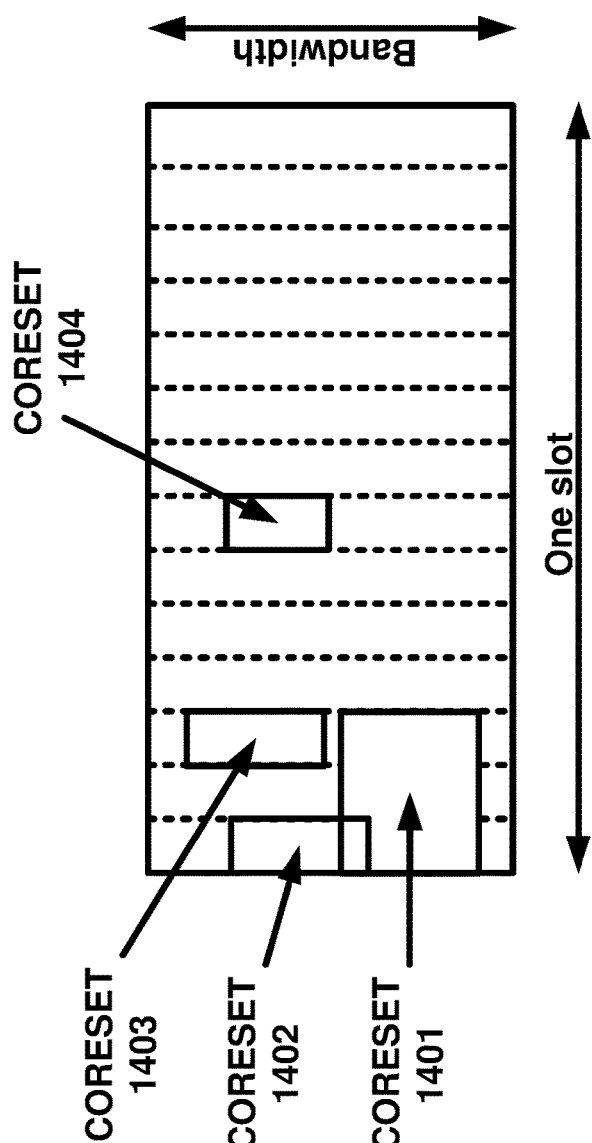
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
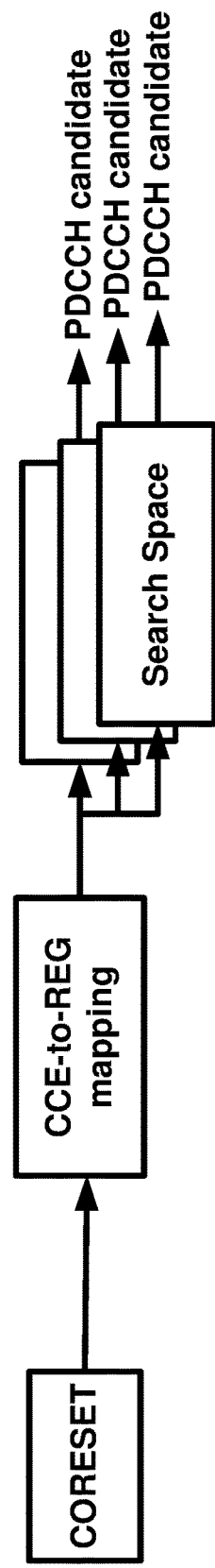
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
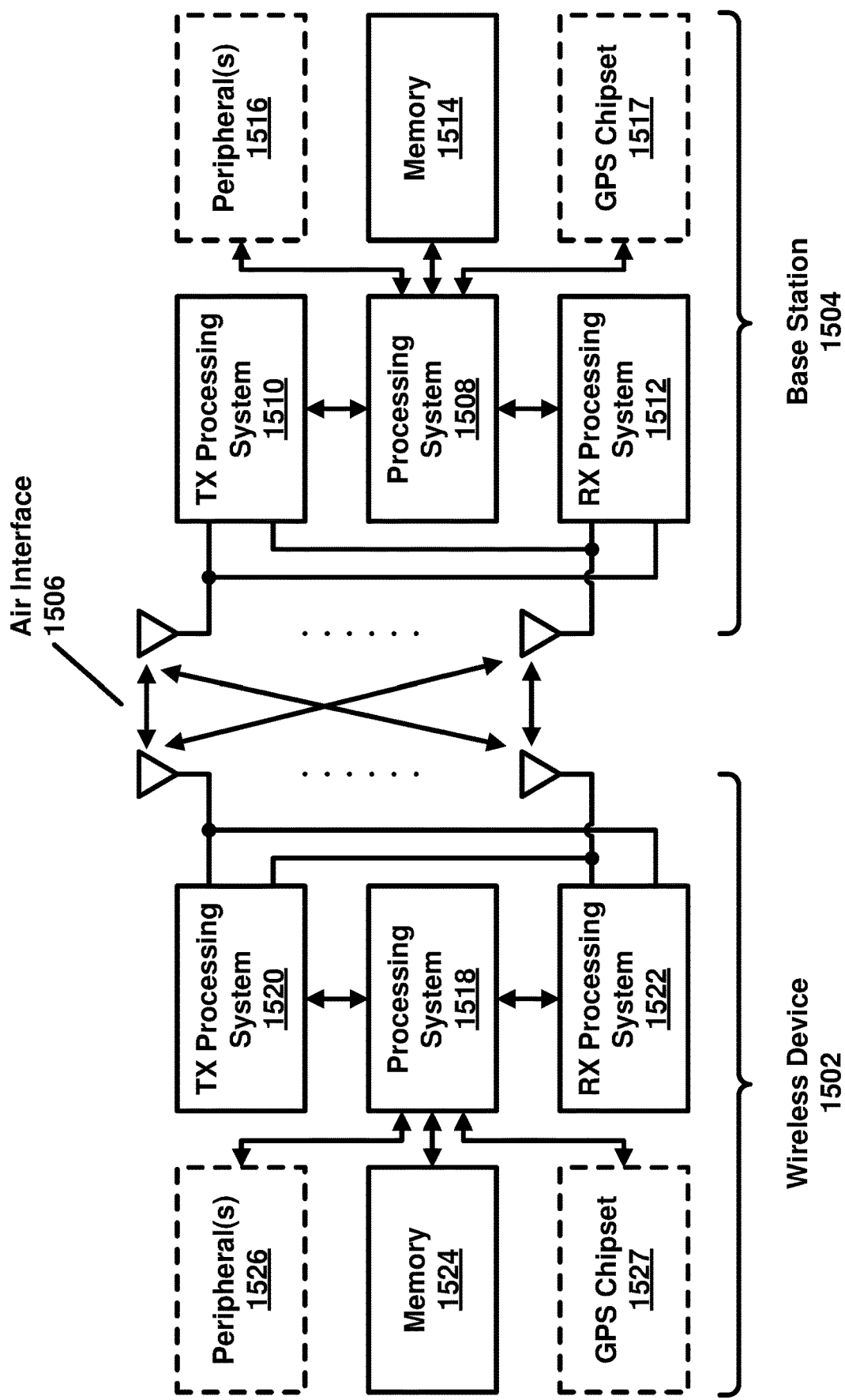
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
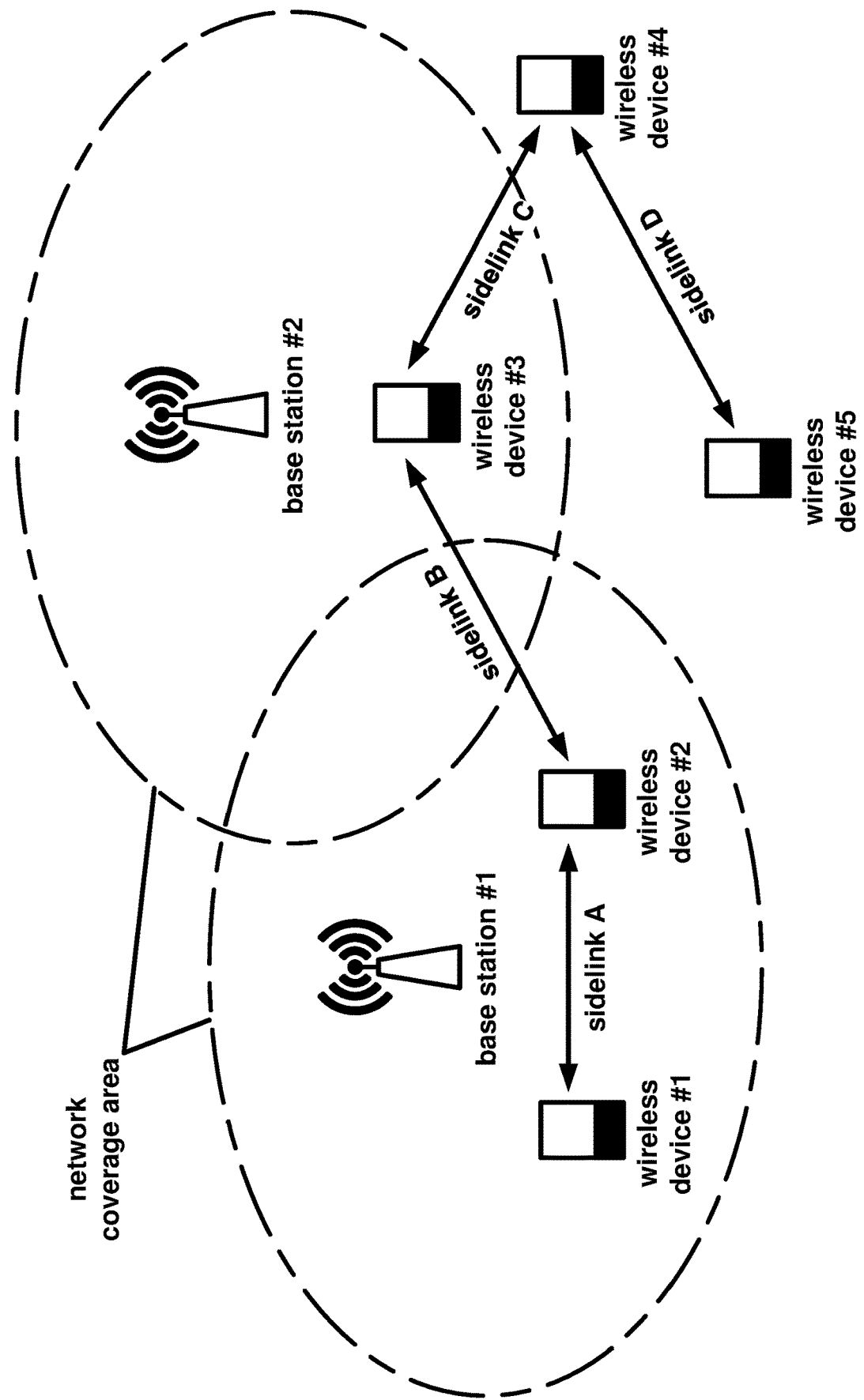
FIG. 17 illustrates an example of sidelink operation scenarios according to an aspect of an example embodiment of the present disclosure.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the figure, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
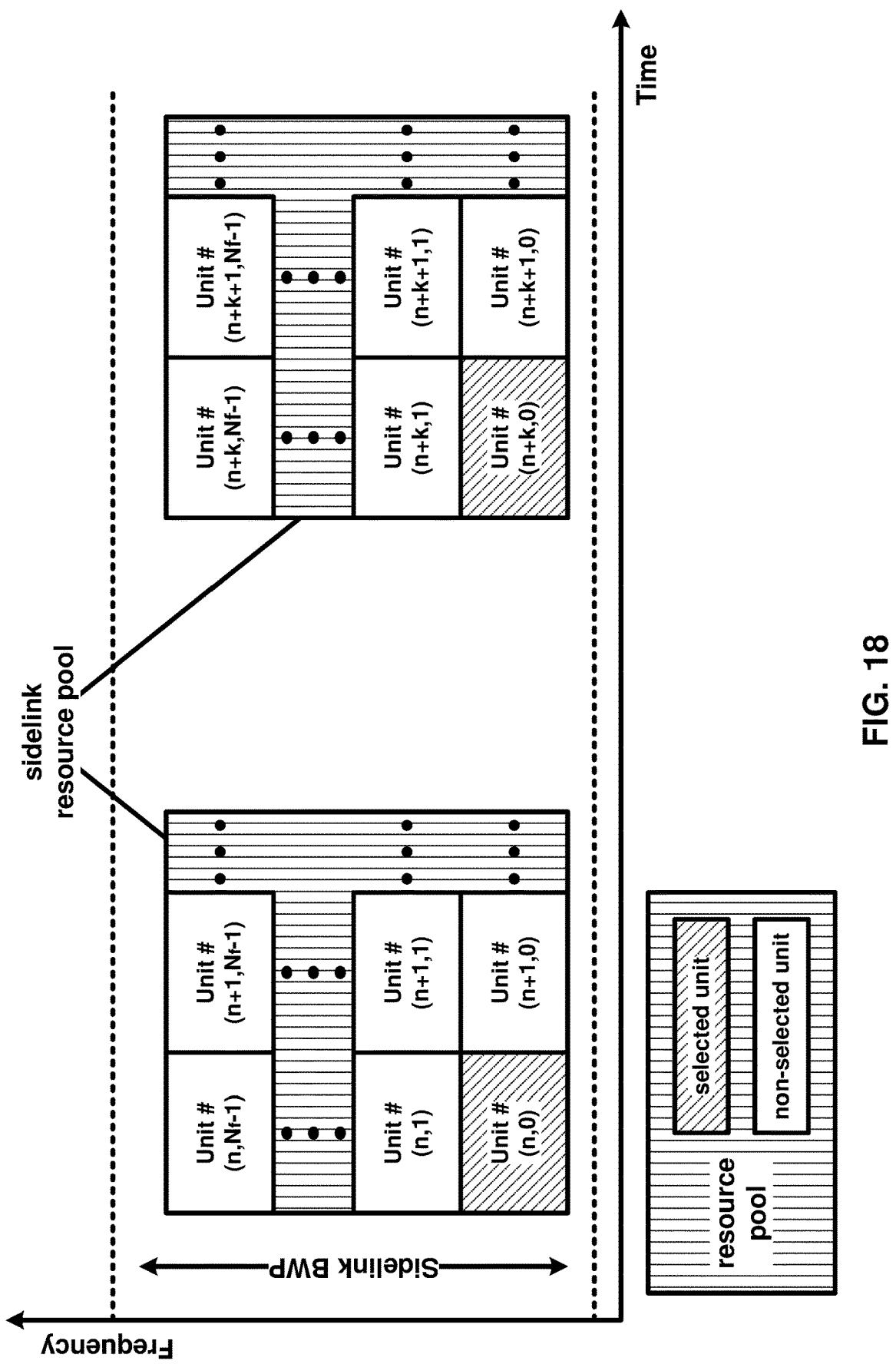
FIG. 18 illustrates an example of sidelink resource allocation according to an aspect of an example embodiment of the present disclosure.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n−k,0), then the wireless device may select resource unit (n,0), resource (n+k,0), etc. For example, if a sidelink transmission from another wireless device is detected in resource unit (n−k,1), then the wireless device may avoid selection of resource unit (n,1), resource (n+k,1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic may use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface.

For V2X communication, a wireless device may provide UE assistance information to an gNB. Reporting of UE assistance information may be configured by gNB transmitting one or more RRC messages. The UE assistance information may include parameters related to the SPS configuration or configured grant resource configuration. Triggering of UE assistance information transmission may be left to UE implementation. For instance, the UE may be allowed to report the UE assistance information when change in estimated periodicity and/or timing offset of packet arrival occurs.

The wireless device may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets.

In an example, a base station may provide one or more SPS and/or configured grant (CG) resource configurations for the UE via RRC signaling. In an example, multiple SPSs and/or multiple CGs may be activated in parallel. For example, a new service may be triggered while a previous service is on-going. In an example, the wireless device may transmit an assistance message to the base station indicating new information about new messages (SPS traffic) for transmission. The base station may provide a second SPS/CG configuration for the new service/message(s).

In an example, a base station may configure an assisted mode (e.g. mode 1, a first mode) for a resource pool or for a sidelink cell or for a sidelink UE for one or more sidelink sessions. In response to being configured with the assisted mode or the first mode, the base station may configure one or more SR configurations which are mapped to one or more logical channels for sidelink sessions. The base station may configure one or more configured grant resources used for the assisted mode or the first mode of the sidelink operation. A wireless device, in response new sidelink data available at MAC layer, may transmit the new sidelink data via the one or more configured grant resources if available. The wireless device may trigger a buffer status reporting (BSR) when the wireless device may not have available configured grant resource(s). The wireless device may determine whether the one or more configured grants are available based on logical channels associated with the one or more configured grants, logical channels of the new sidelink data, a packet size, MCS of the one or more configured grants, latency requirement, periodicity of the one or more configured grants, and/or the like. The wireless device may trigger the BSR to request resource allocations from the base station on the assisted mode or the first mode.

Figure 19:
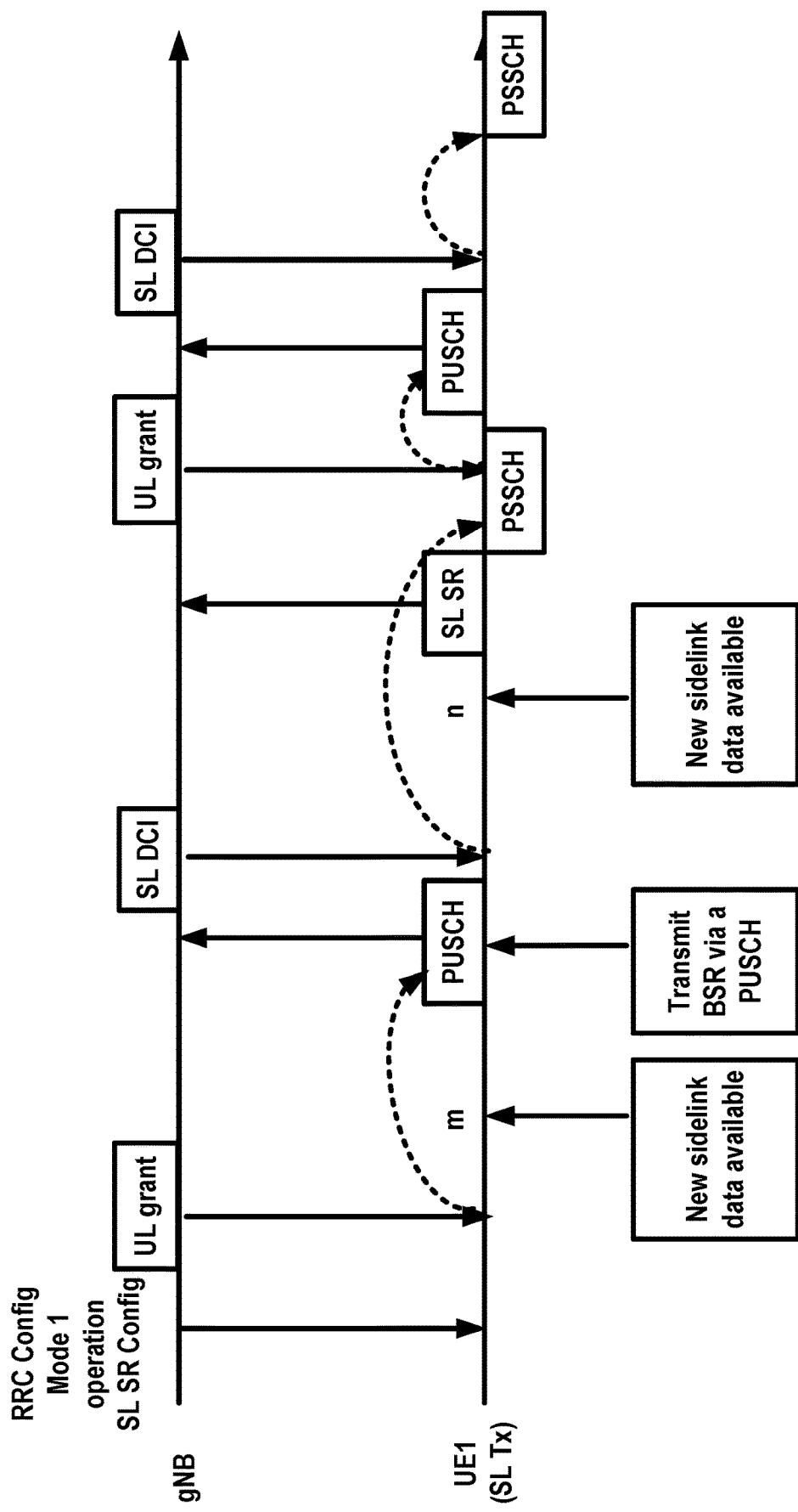
FIG. 19 illustrates a normal BSR/SR procedure according to an aspect of an example embodiment of the present disclosure.

FIG. 19 illustrates an example of a procedure to request the resource allocation from the base station for transmission of new sidelink data. A base station (gNB) may configure an assisted mode or a first mode of sidelink operation to a wireless device (UE1, SL Tx UE). At a time m, the wireless device has new sidelink data available for transmission. The wireless device may trigger a BSR for the new sidelink data. Before the time m, the wireless device receives a UL grant scheduling a PUSCH after the time m. The wireless device may use the PUSCH to carry the BSR. The base station, based on the BSR, may schedule a first sidelink DCI comprising resource assignments for sidelink transmissions. The wireless device may transmit the sidelink transmissions based on the sidelink DCI. The wireless device may have another new sidelink data available for transmission at a time n. The wireless device may trigger a second BSR for the another new sidelink data. At the time n, there is no scheduled PUSCH to carry the second BSR. The wireless device may trigger a SR to handle the second BSR. In response to the SR, the base station may schedule another UL grant for the second BSR. The wireless device may send the second BSR via another PUSCH. Based on receiving the BSR, the base station may schedule a second sidelink DCI. For example, the sidelink DCI may comprise resource assignments for one or more sidelink transmission (e.g., control and data, PSCCH and PSSCH) and/or one or more sidelink feedback resources. The wireless device may transmit the another new sidelink data in response to receiving the second sidelink DCI. A wireless device may receive a sidelink DCI or a DCI comprising one or more resource assignments for sidelink transmission. The sidelink transmission may comprise one or more sidelink data transmissions (PSSCHs), and one or more sidelink control transmissions. A receiver wireless device may determine one or more feedback resources corresponding to the sidelink data transmissions based on one or more rules (e.g., based on a fixed timing between a PSSCH and a PSFCH and configured PSFCH resources) or based on the sidelink DCI or the DCI. The sidelink DCI or the DCI may indicate one or more feedback resources for the receiver wireless device. The sidelink DCI or the DCI may comprise one or more HARQ-ACK resources. The wireless device may transmit HARQ-ACK feedbacks, via the one or more HARQ-ACK resources, corresponding to the indicated resource assignments and/or the indicated sidelink transmission. For example, the wireless device, in FIG. 19, may transmit a first HARQ-ACK feedback for a first PSSCH and a second HARQ-ACK feedback for a second PSSCH even though two HARQ-ACK feedbacks are not shown in the diagram.

Figure 20:
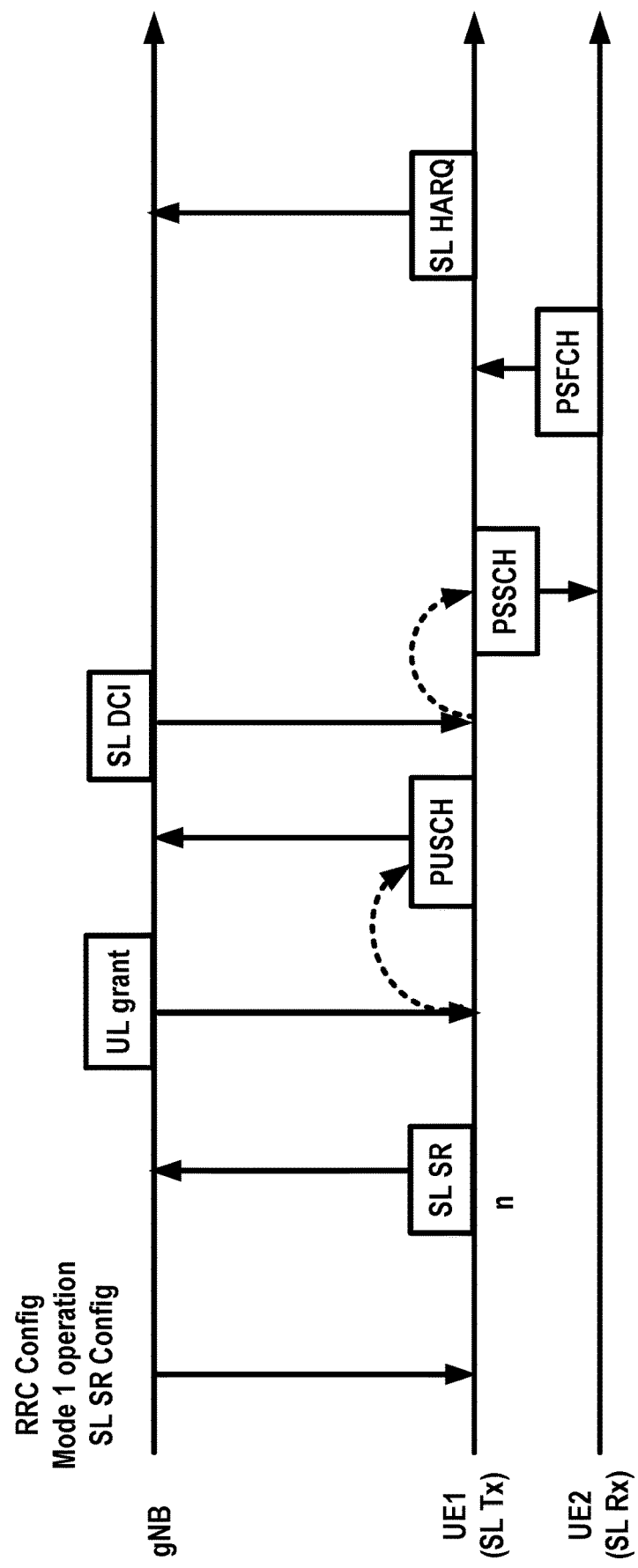
FIG. 20 illustrates a normal BSR/SR procedure according to an aspect of an example embodiment of the present disclosure.

FIG. 20 illustrates a diagram of a first mode of sidelink operation. For example, a base station may configure the first mode (e.g., mode 1, assisted mode) to a first wireless device. The first wireless device may monitor one or more DCIs (e.g., sidelink DCIs) comprising resource assignments for sidelink transmission. The first wireless device may trigger a SR at a time n. The first wireless device may trigger the SR based on a BSR. The first wireless device may trigger the BSR upon new sidelink data available to the first wireless device. For example, the first wireless device has the new sidelink data for an unicast sidelink session or a groupcast sidelink session. The base station may schedule a PUSCH via a UL grant in response to receiving the SR (e.g., SL SR). The first wireless device may transmit the BSR via the PUSCH. Based on the BSR, the base station may schedule a DCI (e.g., SL DCI) comprising resource assignments for sidelink transmissions. The sidelink transmission may comprise PSCCH and PSSCH. The sidelink transmission may comprise one or more of PSCCH and PSSCH. A second wireless device, a receiver of the sidelink session of the new sidelink data, may transmit a feedback via PSFCH. The first wireless device may transmit a HARQ-ACK feedback for the sidelink transmission. In response to a broadcast transmission, the second wireless device may not transmit a feedback to the first wireless device. The first wireless device may indicate HARQ-ACK with a ACK via SL HARQ to the base station in response to the allocated resources being used for the broadcast transmission.

In an example, a wireless device may trigger a sidelink buffer status report (BSR) in response to one or more events occurring. For example, the wireless device operates a sidelink mode 1 operation (e.g., an assisted mode, a first mode, being configured with a sidelink RNTI such as SL-RNTI) and the wireless device may have new sidelink data available at a MAC layer and a logical channel of the new sidelink data may not be available for any already available sidelink transmissions (e.g., not able to be multiplexed with existing sidelink data for the sidelink transmissions). In this case, the wireless device may trigger a regular sidelink BSR. For example, the wireless device may have uplink resources available and number of padding bits remaining after a padding BSR for uplink is added is equal to or larger than a size of the sidelink BSR MAC CE, the wireless device may trigger the sidelink BSR, which is called as a padding sidelink BSR. Based on one or more timers, the wireless device may trigger a regular sidelink BSR (e.g., based on retx-BSR-TimerSL) or trigger a periodic BSR (e.g., based on periodic-BSR-TimerSL).

In existing technologies, a wireless device may trigger a buffer status reporting (BSR) in response to new sidelink data being available to a MAC layer. The wireless device may transmit the BSR via a scheduled PUSCH if available for carrying the BSR. The wireless device may trigger and transmit an SR to obtain resources for the BSR. Based on the SR, the base station may transmit an uplink grant to the wireless device. Upon receiving the uplink grant, the wireless device may transmit the BSR to the base station using the uplink resources indicated in the uplink grant. The BSR may indicate a buffer size level, for example, how much data is in a buffer and is to be transmitted. Based on the information in the BSR, the base station may select resources for sidelink transmissions and assign them to the wireless device. The base station may transmit one or more DCIs comprising resource assignments for sidelink transmissions (e.g., sidelink DCIs, DCIs scrambled with a RNTI for sidelink operation such as SL-RNTI) for the new sidelink data. This procedure may result in increased latency as messages are exchanged between the wireless device and the base station (SR, uplink grant, BSR, DCI), making it ineffective for sidelink applications such as platooning, industrial collaborations, see through, etc. As an alternative, the base station may provide the wireless device with one or more configured grant resources, allowing the wireless device to perform periodic and/or semi-persistent sidelink transmission without waiting to receive sidelink resources in a DCI. To obtain the configured grant resources, the wireless device may provide UE-assistance information for one or more semi-persistent or periodic sidelink sessions. The UE-assistance information may comprise traffic assistance information relating to one or more traffic patterns, where each traffic pattern is associated with a periodicity, a time offset, a message size, a priority, a logical channel, and optionally a destination of a sidelink session. The base station may configure the configured grant resources based on the UE-assistance information. However, in some applications (for example, aperiodic low latency sidelink sessions), configured grants may require that large amounts of resources be set aside, which may be utilized only sporadically. Existing mechanisms may not efficiently support diverse sidelink application requirements and may need to be enhanced.

In an example of an enhanced procedure, a wireless device may transmit, to a base station, enhanced traffic assistance information corresponding to a sidelink session (for example, a sidelink session requiring low latency). In an example, the enhanced traffic assistance information may comprise a traffic type indication informing the base station as to whether the sidelink session/traffic is associated with periodic data or aperiodic data. In an example, the enhanced traffic assistance information may comprise a nominal buffer size level. In an example, the enhanced traffic assistance information may comprise an indication of an SR configuration (for example, an SR configuration index) associated with the sidelink session/traffic. Based on the enhanced traffic assistance information, the base station may determine to assign sidelink resources using existing procedures (e.g., dynamic scheduling or configured grants) or enhanced procedures in accordance with the present disclosure. In an example, the base station may, based on the enhanced traffic assistance information, determine to use an enhanced procedure that reduces latency while avoiding excessive increases in resource consumption. These advantages may be particularly evident in the case of sidelink sessions associated with aperiodic traffic requiring low latency.

In an example, the enhanced procedure may comprise transmitting, by the wireless device, traffic assistance information for a sidelink session. For example, the traffic assistance information may indicate an aperiodic traffic type. The traffic assistance information may indicate an identifier indicating a logical channel associated with a sidelink traffic/the sidelink session. The traffic assistance information may indicate one or more periodicities associated with the logical channel. In response to receiving the traffic assistance information, the base station may transmit one or more RRC messages indicating one or more configured grant configurations. The configured grant configurations may be determined based on the one or more periodicities of the logical channel. When the wireless device has new sidelink data available, the wireless device may transmit, to the base station, trigger a transmission of a buffer status report (BSR). The wireless device may transmit a scheduling request (SR) in response to the triggering the transmission of the BSR. The base station may receive the SR and may transmit, in response to the SR, one or more DCIs comprising sidelink resources for transmission of the new sidelink data. In response to the SR, the base station may transmit one or more activation commands indicating activation of the one or more configured grant configurations. In response to the transmission of the SR, the wireless device may cancel the BSR.

The base station may reduce a scheduling latency by activating the one or more configured grant configurations, in response to the SR, without waiting for the wireless device to deliver a BSR. In existing procedures, the wireless device may complete a SR process when the wireless device may multiplex the BSR or transmit the BSR. In embodiments, the base station may skip scheduling an UL grant for the BSR. In embodiments, for example, the wireless device may, as part of the enhanced procedure, cancel the pending BSR/SR upon receiving the one or more DCIs (e.g., activation DCI(s) of the one or more configured grant configurations). The wireless device may use the sidelink resources indicated in the one or more DCIs to transmit the new sidelink data with reduced latency.

In an example, the base station may select sidelink resources for transmission of the new sidelink data based on a nominal buffer size level indicated by the enhanced traffic assistance information. In the enhanced procedure described above, the base station may reduce latency by selecting the assigned resources without waiting for the wireless device to deliver a BSR. The enhanced procedure may further entail selection of sidelink resources (for example, size, location, or immediacy of sidelink resources) based on the nominal buffer size level associated with the sidelink session. As an example, the base station may assume, predict and/or estimate the size, location, and/or immediacy of the assigned resources based on the nominal buffer size level. The base station may assume a pre-fixed buffer size level in case the wireless device may not have provided one or more parameters or a nominal buffer size level for a sidelink session or a logical channel requiring a low latency scheduling.

Embodiments may allow shorter scheduling latency by allowing pre-indicated information (e.g., a message size, a nominal buffer size) to be used for scheduling for a logical channel or for a sidelink session by a base station. Embodiments may not require pre-reserved large amount of resources for handling aperiodic low latency required traffic, and thus will reduce unnecessary resource booking and increase resource utilization efficiency.

Figure 21:
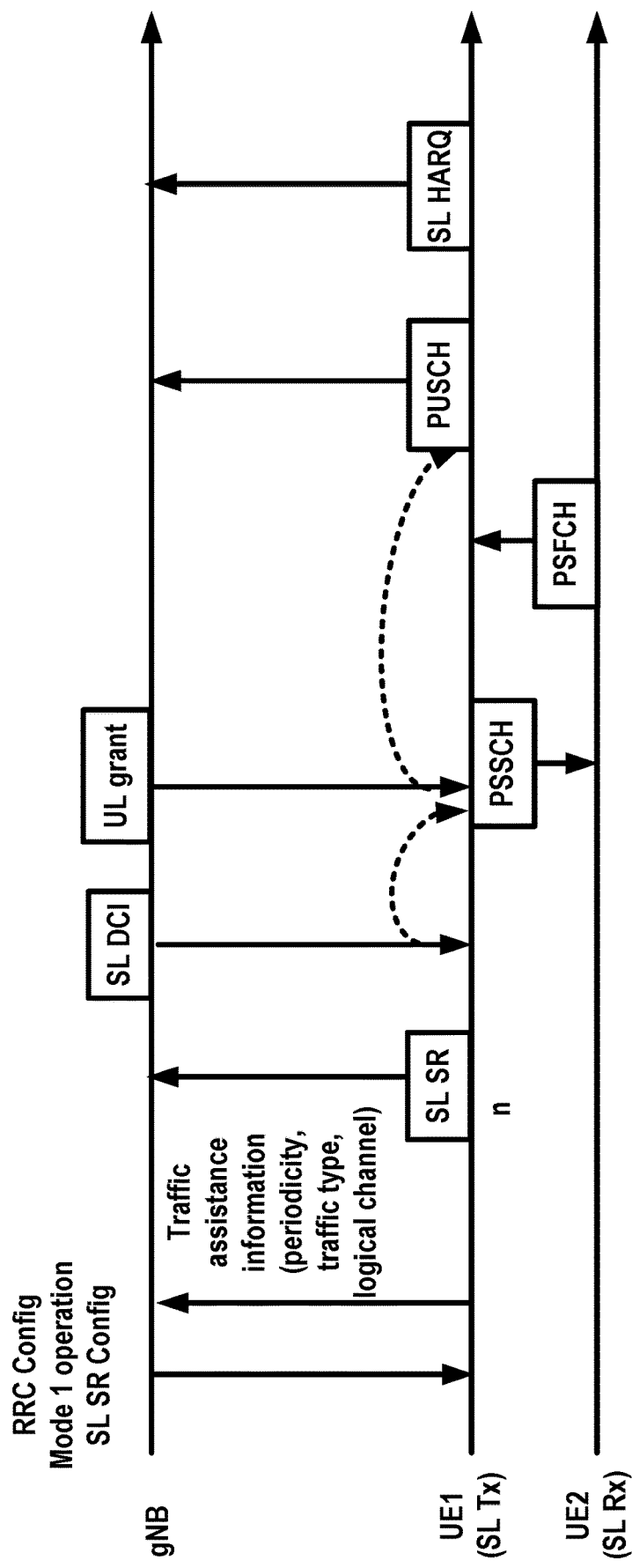
FIG. 21 is an illustration of an aspect of an example embodiment of the present disclosure.

FIG. 21 illustrates an example. A base station may configure a first mode of sidelink operation (e.g., an assisted mode, mode 1) for a resource pool, for a wireless device, or for a sidelink cell to the wireless device. The wireless device may provide one or more UE assistance information. For example, the one or more UE assistance indication may comprise a set of traffic pattern assistance information. A traffic pattern assistance information may comprise one or more parameters such as a periodicity, a message size, a logical channel, a priority, a destination ID, and/or a traffic type. The traffic pattern assistance information may correspond to a sidelink session that the wireless device is a transmitter wireless device. The traffic type may represent whether the traffic pattern is periodic or aperiodic. The traffic pattern assistance information may comprise a nominal buffer size level for the traffic/sidelink session. The base station may utilize the nominal buffer size level, if indicated, in scheduling resources for sidelink transmissions. The wireless device may also inform a SR configuration, via the wireless device may transmit SRs of the logical channel, associated with the traffic assistance information. For example, the base station may configure one or more SR configurations for a logical channel (for example, a plurality of SR configuration associated with the logical channel). The wireless device may provide an index of a SR configuration used for transmitting SRs corresponding to the logical channel indicated by the traffic assistance information. The base station, in response to receiving the SRs, may utilize the traffic assistance information for the logical channel. When the wireless device may have new sidelink data available at MAC layer, the wireless device may trigger a BSR. Based on the BSR, wherein the BSR is triggered for one or more logical channels, the wireless device may trigger a SR for the new sidelink data (e.g., SL SR) and may transmit the SR at a time n. The base station may schedule one or more DCIs comprising resource assignments for sidelink transmissions of the new sidelink data (e.g., SL DCI). The base station may also schedule a UL grant to schedule a PUSCH for the BSR. The wireless device may transmit the sidelink transmissions (e.g., one or more sidelink transport blocks of the new sidelink data) based on the one or more DCIs. The wireless device may transmit the BSR via the PUSCH based on the UL grant. A second wireless device (e.g., UE2, SL Rx UE) may transmit a feedback (e.g., PSFCH) in response to the sidelink transmissions (e.g., PSSCH). The wireless device may send HARQ-ACK feedback to the base station for the allocated resources for the sidelink transmissions.

In an example, a wireless device may indicate one or more parameters for a sidelink session via a UE assistance information. The one or more parameters may comprise one or more configuration parameters such as a logical channel, a priority of the logical channel (if not available/configured by a base station), a periodicity, a message size, a traffic type (e.g., aperiodic or periodic), a sidelink destination ID, MCS or TBS, a number of retransmission/repetition, and/or the like. The wireless device may have new sidelink data being available to a MAC layer. The wireless device may determine whether a second logical channel of the new sidelink data is associated with the sidelink session (e.g., the second logical channel is equal to the logical channel). For example, the wireless device may have indicated the one or more parameters related to the sidelink session to the base station. The wireless device may trigger a BSR for the new sidelink data. In response to the determining, the wireless device may trigger a SR for the BSR and transmit the SR via a valid PUCCH resource based on a SR configuration. A base station may determine whether there is available the one or more parameters for the sidelink session or for the logical channel. The baes station may determine one or more predetermined parameters for the sidelink session or for the logical channel based on the priority of one or more logical channels associated with the SR configuration via the SR is received. Based on the one or more parameters or the one or more (pre-)determined parameters (e.g., based on predetermined values or based on the UE assistance information), the base station may schedule one or more DCIs comprising resource assignments for sidelink transmissions of the new sidelink data. The base station may optionally transmit an UL grant for a PUSCH for the BSR transmission.

In the example, the wireless device may receive the one or more DCIs comprising resource assignments for the sidelink transmissions of the new sidelink data. The wireless device may schedule the one or more sidelink transmissions (e.g., one or more sidelink transport blocks of the new sidelink data) based on the one or more DCIs. In response to the receiving the one or more DCIs, the wireless device may cancel the pending/triggered SR, wherein the SR has been triggered for the new sidelink data, based on one or more criteria being met. For example, the one or more criteria may comprise that the SR is associated with one or more logical channels with one or more priorities. For example, the one or more priorities are greater than or equal to a first threshold value. For example, the one or more criteria may comprise that the SR is triggered by a logical channel with a priority. For example, the priority of the logical channel is greater than or equal to a second threshold value. For example, the one or more criteria may comprise that the one or more DCIs comprising resource assignments. For example, the resource assignments are enough to accommodate one or more sidelink transport blocks comprising the new sidelink data that has triggered the SR. For example, the one or more criteria may comprise that a size of the new sidelink data is aligned with the one or more parameters of the sidelink session informed to the base station via the UE-assistance information. The message/data size of the new sidelink data is small or similar size to the message size of the UE-assistance information, the wireless device may cancel the SR in response to receiving the one or more DCIs. For example, the one or more criteria may comprise that the SR is triggered only for sidelink BSRs. The wireless device may not cancel the SR when the SR is triggered for both sidelink and uplink BSRs. For example, the one or more criteria may comprise that the SR is triggered for sidelink BSRs for one or more sidelink logical channels. For example, the wireless device may have informed via UE-assistance information on one or more parameters of each sidelink logical channel/sidelink session of the one or more sidelink logical channels. The wireless device may not cancel the SR when there is at least one BSR for a sidelink logical channel mapped to the triggered SR, when the base station may not schedule DCIs comprising resource assignments without receiving the at least one BSR. For example, the one or more criteria may comprise that the SR is triggered for one or more second sidelink logical channels. For example, the one or more second logical channels are configured to support cancelling the SR in response to receiving sidelink DCIs or are configured to support a low latency enhanced SR procedure described in the specification.

In response to cancelling the SR when the one or more criteria is met, the wireless device may keep other pending SR(s) sharing a same SR configuration to the SR. The wireless device may maintain pending SR(s) of different SR configuration(s) from the SR configuration. The wireless device may reset/stop sr-ProhibitTimer when there is no pending SR other than the triggered SR on the SR configuration, where the triggered SR has been transmitted via the SR configuration. The wireless device may continue sr-ProhibitTimer when there is at least one pending SR on the SR configuration. The wireless device may assume sr-ProhibitTimer is expired when there is a pending SR on the SR configuration, so that the pending SR may be transmitted. The wireless device may reset a number of retransmission counter for a SR transmission (e.g., SR_COUNTER) in response to the cancelling the SR.

In an example, a wireless device may determine a first PUCCH resource or a second PUCCH resource for a SR transmission depending on whether the one or more criteria is being met. For example, the one or more criteria may comprise (a) a size of new sidelink data triggered the SR is smaller than or equal to a message size indicated via a UE-assistance information; (b) one-shot small data arrival such that one resource allocation may be enough and a follow-up BSR transmission may not be necessary; (c) the SR is transmitted via a SR configuration, where the SR configuration is configured with no BSR transmission; (d) the wireless device may have sent the BSR in another uplink data such that a new grant for a PUSCH for the BSR may not be necessary; (e) the wireless device has a low latency data such that scheduling resources without receiving BSR is required; (f) the wireless device has aperiodic low latency data such that the base station may schedule resources based on predetermined buffer size level information available at the base station. The wireless device may select the first PUCCH resource to inform the one or more criteria is being met. The wireless device may select the second PUCCH resource to inform the one or more criteria has not being met. In response to receiving the SR via the first PUCCH, the base station may not schedule the UL grant for the PUSCH, as the wireless device may not have any BSR to inform. In response to receiving the SR via the second PUCCH, the base station may schedule the UL grant for the BSR. In response to transmitting the SR via the first PUCCH resource, the wireless device may cancel the SR and the BSR in response to receiving the one or more DCIs. In response to transmitting the SR via the second PUCCH resource, the wireless device may keep the SR and the BSR in response to receiving the one or more DCIs.

Figure 22:
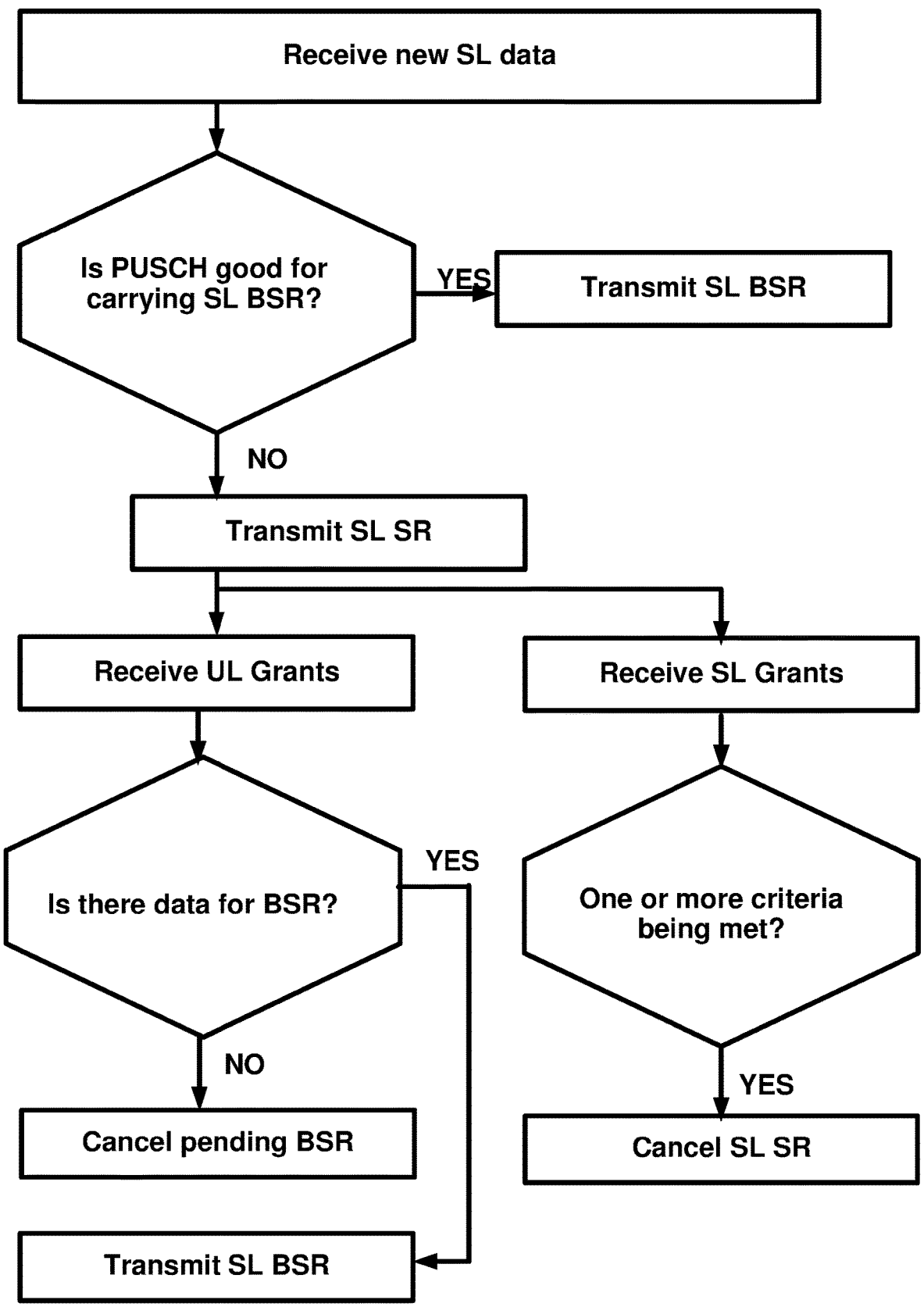
FIG. 22 is an illustration of an aspect of an example embodiment of the present disclosure.

FIG. 22 illustrates a flow diagram of embodiments. A wireless device may have new sidelink data available at a MAC layer. The wireless device may trigger a sidelink BSR for the new sidelink data. Based on logical channel(s) of the new sidelink data and an PUSCH where the wireless device may carry the BSR and based on a latency requirement associated with the logical channel(s), the wireless device may determine whether to transmit the BSR via the PUSCH. The wireless device transmits the PUSCH carrying the BSR in response to the determining. The wireless device may trigger a SR in other cases. The wireless device may receive one or more uplink grants comprising resource assignments for uplink PUSCHs. In response to the receiving the one or more uplink grants, the wireless device may determine whether there is any pending BSR or any data left for triggering a BSR. The wireless device may piggyback the pending BSR or the BSR when there is any data. For example, logical channel(s) of the any data may be multiplexed with the scheduled uplink PUSCHs. The wireless device may cancel the pending BSR when there is no new data for BSR transmission via the scheduled uplink PUSCHs. The wireless device may receive one or more sidelink grants comprising resource assignments for sidelink transmissions. The wireless device may determine whether one or more criteria is being met. In response to the one or more criteria being met, the wireless device may cancel the pending BSR. Otherwise, the wireless device may keep the pending SR. The one or more criteria may be determined based on examples specified in this specification.

In an example, the wireless device may inform/indicate to the base station via a UE-assistance information (e.g., via RRC signaling, MAC CEs, DCIs) on one or more parameters of the sidelink session or the logical channel. A sidelink session may be defined as a priority, a logical channel, and a sidelink destination ID for a wireless device. The sidelink session may be defined as a sidelink destination ID for the wireless device. The one or more parameters may comprise one or more of a (nominal) buffer size level, the logical channel index, MCS, a packet size, a destination ID, and a periodicity/time offset. The (nominal) buffer size level may indicate an expected buffer size level of a BSR of the logical channel/sidelink session when a SR is triggered for the logical channel assuming the logical channel is configured dedicated to a first SR configuration, where the SR is transmitted via the first SR configuration. The wireless device may indicate the expected (nominal) buffer size level based on one or more logical channels associated with the first SR configuration, when there are more than one logical channel mapped to the first SR configuration. The wireless device may cancel the pending BSR in response to receiving the one or more DCIs and a buffer size level computed in the pending BSR is smaller than or equal to the indicated expected buffer size level via the UE-assistance information (e.g., nominal buffer size level). This is to minimize transmitting the BSR, which the base station has obtained the information already. This may reduce resource consumption by reducing unnecessary BSR transmissions.

In an example, a wireless device may trigger an SR. The SR is considered as pending until the SR is cancelled. In response to cancelling all pending SR(s) of a SR configuration, sr-ProhibitTimer may be stopped in one or more conditions. The one or more conditions may comprise a first case where all pending SR(s) are triggered for uplink and/or sidelink data and the MAC PDU is assembled. The MAC PDU may comprise one or more BSRs accommodating buffer status up to and including a last event that has triggered the BSR or the SR. The one or more conditions may comprise a second case where all pending SR(s) are triggered by sidelink BSR(s) and a second MAC PDU is assembled. The MAC PDU may comprise one or more BSRs accommodating buffer status up to and including a last event that has triggered the sidelink BSR or the sidelink SR. The one or more conditions may comprise a third case where all pending SR(s) are triggered by sidelink BSR(s) and the wireless device is configured/instructed/being transitioned to a second mode (e.g., UE-autonomous, mode 2) of sidelink transmission. The one or more conditions may comprise a fourth case where all pending SR(s) are triggered by sidelink BSR(s) and one or more DCIs comprising resource assignments for sidelink transmissions may accommodate all the new sidelink data (pending).

In an example, the wireless device may continue sr-ProhibitTimer in response to cancelling the SR and there are pending SR(s) of the SR configuration. The wireless device may stop the sr-ProhibitTimer in response to receiving one or more uplink grants scheduling PUSCH(s) for the BSR. For example, the wireless device may carry the BSR via the scheduled PUSCH(s) based on the one or more uplink grants.

In response to receiving one or more sidelink DCIs (e.g., DCIs comprising resource assignments for sidelink transmissions), the wireless device may cancel the triggered SR in response to one or more criteria being met. The wireless device may cancel one or more pending sidelink SR(s) sharing a same SR configuration to the cancelled SR and triggered by one or more logical channels. For example, a highest priority of the one or more logical channels may be larger than or equal to a threshold value. The one or more criteria may comprise a first case where a highest priority of one or more second logical channels triggering the SR may exceed a second threshold value. The one or more criteria may comprise a second case where the one or more sidelink DCIs may accommodate the new sidelink data triggered the BSR and the SR. The one or more criteria may comprise a third case where the SR is triggered only by sidelink BSR(s) and a lowest priority of one or more third logical channels triggered a pending SR sharing the same SR configuration to the SR is greater than or equal to a third threshold value.

In an example, one or more triggered sidelink BSRs may be cancelled when the one or more sidelink DCIs may accommodate all pending data or all the new sidelink data (e.g., data in one or more buffers) available for sidelink transmissions. In an example, the wireless device may reset/restart a retransmission timer of sidelink BSR (e.g., retx-BSR-TimerSL) in response to completing a sidelink BSR transmission. For example, the wireless device may reset/restart retx-BSR-TimerSL in response to receiving the one or more sidelink DCIs. For example, the wireless device may reset/restart retx-BSR-TimerSL in response to flushing a data/transport block of a HARQ process, where the data/transport block comprises the sidelink BSR. For example, the wireless device may reset/restart retx-BSR-TimerSL in response to flushing a data/transport block of a HARQ process, wherein the data/transport block comprises the sidelink BSR.

In an example, the wireless device may cancel the SR in response to receiving the one or more sidelink DCIs, the wireless device may not receive one or more uplink grants scheduling PUSCH(s) to carry the BSR. The wireless device may keep the pending BSR while the pending SR is cancelled. The base station may reschedule the PUSCH(s) for the BSR. The wireless device may employ a SR retransmission timer (e.g., retx-SR-TimerSL) for a SR configuration, where the wireless device may restart the retx-SR-TimerSL in response to the cancelling the SR. In response to an expiry of the retx-SR-TimerSL, the wireless device may check whether any pending BSR associated with the SR configuration (e.g., one or more logical channels associated with the SR configuration). The wireless device may re-trigger a SR in response to identifying the pending BSR. The wireless device may reset/stop the retx-SR-TimerSL in response to receiving one or more uplink grants or in response to multiplexing the BSR for a data transmission or in response to transmitting the BSR.

In an example, a wireless device may obtain traffic information for one or more sidelink sessions. Traffic information for a sidelink session may comprise one or more parameters such as a periodicity, a packet size, data burstiness, inter-arrival time, and variance of packet size. Based on the traffic information, the wireless device may request resources for sidelink transmission via an enhanced scheduling request mechanism with lower latency and lower resource waste. For example, the wireless device may provide the base station with first traffic pattern information via a UE-assistance information for a first sidelink session. The wireless device may provide the base station with second traffic pattern information for a second sidelink session. The first traffic information and the second traffic information may comprise one or more parameters such as a periodicity, a packet size for each transmission, a priority or logical channel for the first sidelink session and the second sidelink session. The first information of the first sidelink session may further comprise whether the traffic type is aperiodic or periodic or whether the traffic is started immediately or may be started later (e.g., a starting time of the first sidelink session). The base station may configure and activate one or more configured grants in response to receiving a second traffic information comprising periodic data. The base station may not configure configured grant resources or may configure without activation of one or more second configured grants in response to receiving the first traffic pattern information comprising aperiodic traffic type.

In an example, a wireless device may determine whether data associated with one or more sidelink sessions may have periodic data or aperiodic traffic type. The wireless device may transmit traffic information to a base station. The traffic information may indicate whether the traffic type associated with the one or more sidelink sessions is periodic or aperiodic. Based on the traffic information, a base station may configure one or more configured grants. For example, the base station may configure one or more configured grant resources for one or more periodic sidelink sessions. For example, the base station may configure one or more SR configurations for aperiodic sidelink sessions (e.g., short periodicity SR configurations for a low latency aperiodic sidelink session) so that the wireless device may request scheduling with a low overhead in response to data arrivals for the aperiodic sidelink sessions.

In an example, a wireless device may have new sidelink data available at MAC layer. The wireless device may trigger a BSR for the new sidelink data. The wireless device may trigger and transmit a SR for the BSR. A base station, in response to receiving the SR, may schedule one or more sidelink DCIs comprising resource assignments for one or more sidelink transmissions of the new sidelink data, based on one or more traffic information indicated by the wireless device. For example, the wireless device may indicate a first traffic information comprising a first logical channel. When the new sidelink data is associated with the first logical channel, the wireless device may transmit the SR associated with the first logical channel. In response to receiving the SR, the base station may determine the SR is associated with the first logical channel. For the first logical channel, the base station may transmit sidelink scheduling DCIs to the wireless device for the new sidelink data. The base station may not have received the BSR from the wireless device for the new sidelink data. The base station may rely on the first traffic information for the sidelink scheduling DCIs when the base station has not received the BSR. The base station may use the BSR and the first traffic information for the sidelink scheduling DCIs when the base station has received the BSR. The wireless device, in response to receiving the sidelink scheduling DCIs, may cancel the triggered SR. The wireless device may keep one or more other pending SRs without cancellation, in response to receiving the sidelink scheduling DCIs. The wireless device, in response to transmitting the BSR, may cancel all pending SRs on a SR configuration used for the triggered/transmitted SR.

In an example, a wireless device may skip triggering a BSR and may trigger a SR directly in response to new data arrival at the MAC layer. This may reduce a latency to receive one or more scheduling DCIs. For example, when the wireless device may carry the BSR on a PUSCH, a base station may need to receive one or more PUSCHs of a same TB of initial and retransmission of a same HARQ process. A bit error rate of a PUSCH may be lower than a bit rate of a SR/PUCCH. When the base station may not successfully decode an initial PUSCH transmission of the BSR, the base station may need to request a retransmission, which may increase the scheduling latency. To minimize the scheduling latency, the wireless device may not generate the BSR when one or more conditions are satisfied. For example, the one or more conditions may comprise a first case where the wireless device may receive new data associated with a priority or a logical channel, where the priority or the logical channel is associated with a special SR configuration. The base station may configure the special SR configuration. For example, the wireless device may skip triggering a BSR in response to a SR via the special SR configuration. The base station may configure a priority threshold value to determine one or more special SR configurations. For example, a highest priority of one or more logical channels associated with a SR configuration may be larger than or equal to the priority threshold, the wireless device considers the SR configuration as the special SR configuration. For example, the one or more conditions may comprise a second case where the wireless device may receive new data associated with a logical channel. For example, a priority of the logical channel is greater than or equal to a second threshold.

For example, the one or more conditions may comprise a third case where the wireless device may be configured by the base station whether to trigger a BSR or not for a logical channel, and the logical channel for the new data is configured with an option not to trigger the BSR. For example, the base station may configure a first option of a regular BSR procedure or a second option of skipping a BSR for a sidelink destination or for a sidelink session. Based on the configuration, the wireless device may determine which option to apply. The configuration between the first option and the second option may be configured for a SR configuration. The configuration between the first option and the second option may be configured for a sidelink cell or for a sidelink resource pool. The configuration between the first option and the second option may be configured for the wireless device and apply the configured option for all logical channels configured to the wireless device.

The wireless device may not trigger a SR via the special SR configuration when a sidelink SR timer is running. The wireless device may start the sidelink SR timer in response to transmitting the SR for the special SR configuration. In response to having an expiry of the sidelink SR timer, the wireless device may retransmit the SR or transmit a pending SR via the special SR configuration.

Figure 23:
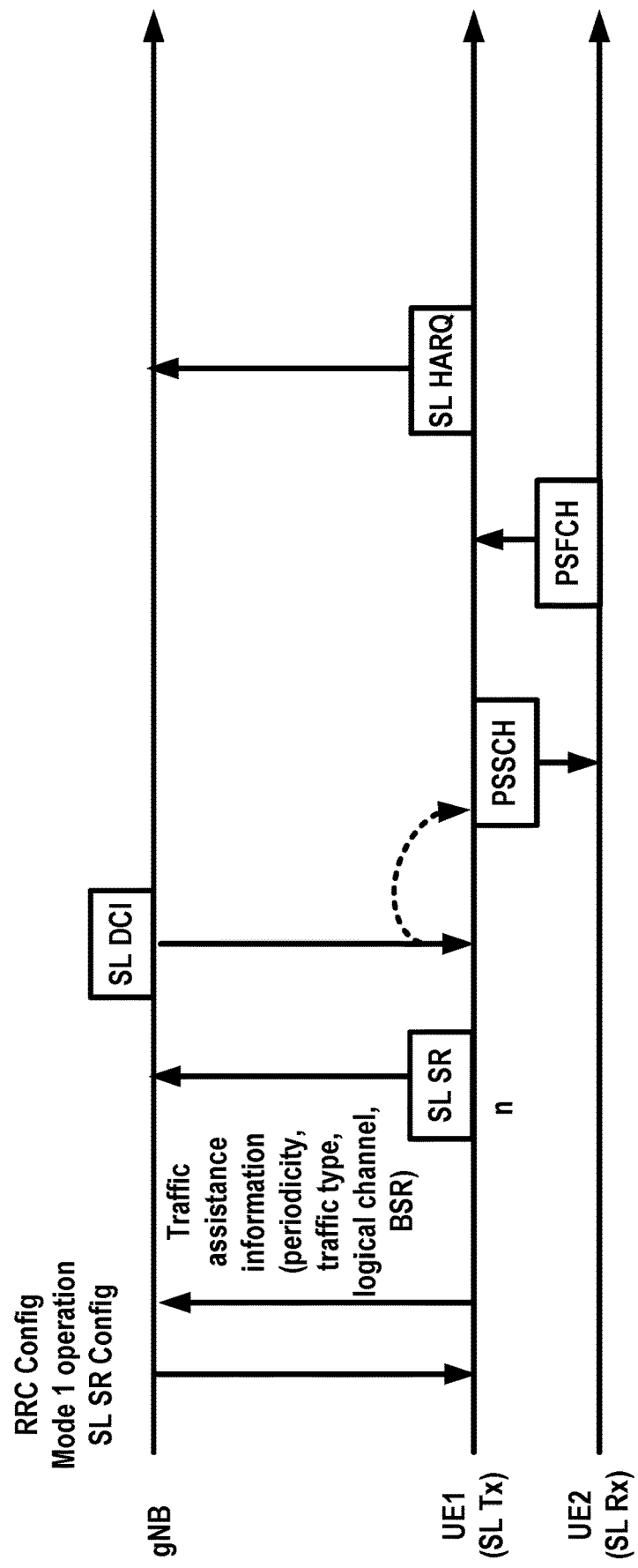
FIG. 23 is an illustration of an aspect of an example embodiment of the present disclosure.

FIG. 23 illustrates an example. A base station may configure a first mode (e.g., an assisted mode, mode1) of sidelink operation to a wireless device. The wireless device may request/inform data arrival for scheduling resources for sidelink transmissions by the base station on the first mode of sidelink operation. The wireless device may have new data available at a MAC layer before a time n. Based on the one or more conditions being met (e.g., a priority of the new data is higher than or equal to a threshold value, an associated SR configuration is configured as a special SR configuration), the wireless device may transmit a PUCCH carrying the SR at the time n without triggering a BSR for the new data. The base station, in response to receiving the SR, may schedule one or more sidelink DCIs comprising resource assignments for sidelink transmissions for the new data. The wireless device may schedule the sidelink transmissions (e.g., one or more sidelink transport blocks of the new sidelink data) based on the one or more sidelink DCIs. A second wireless device (e.g., a receiver UE, UE2, SL Rx) may response a HARQ feedback via PSFCH. The wireless device (e.g., a transmitter UE, UE1, SL Tx) may transmit a HARQ-ACK feedback to the base station, based on the HARQ feedback from the second wireless device.

Figure 24:
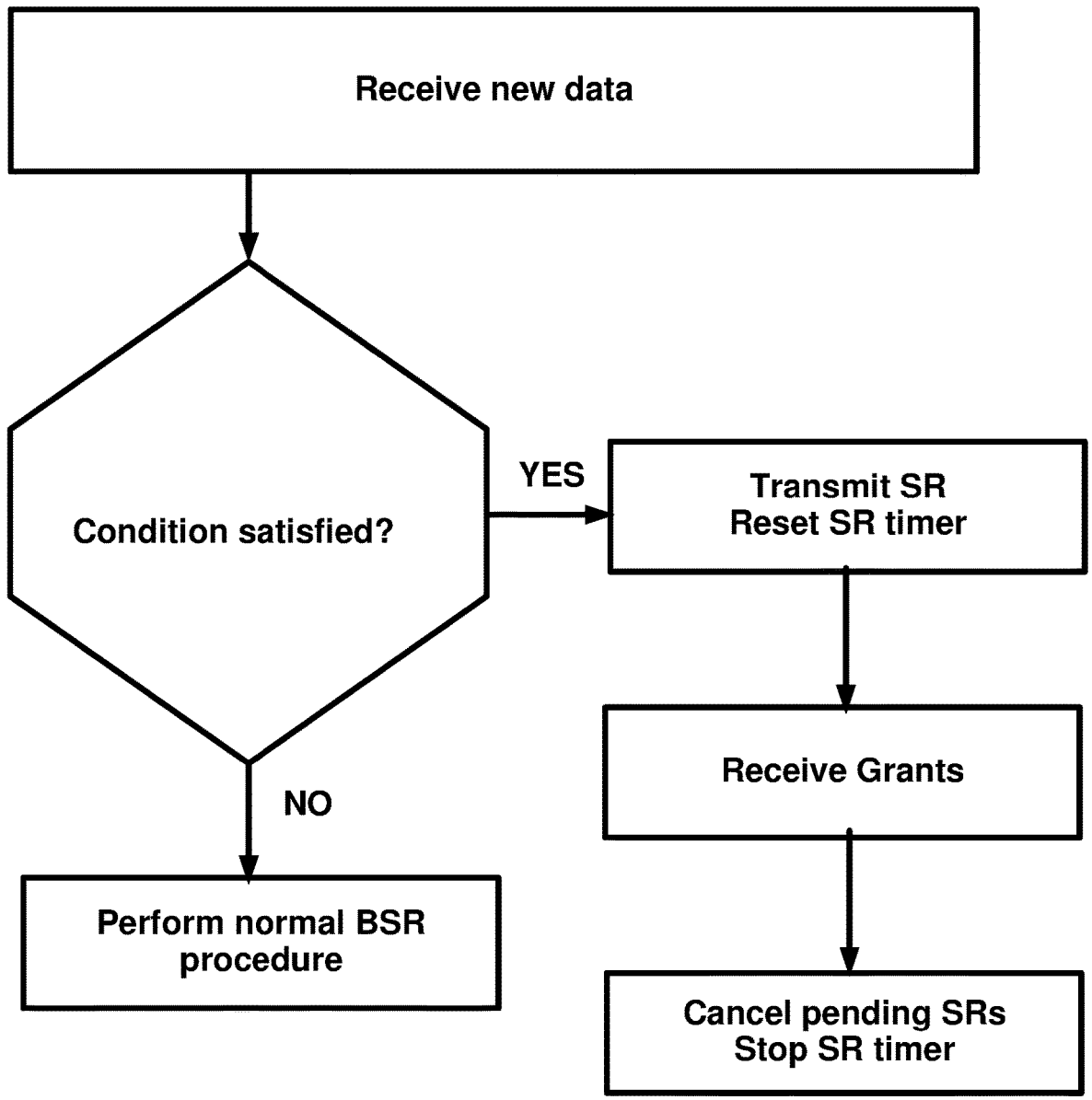
FIG. 24 is an illustration of an aspect of an example embodiment of the present disclosure.

FIG. 24 illustrates a flow diagram of embodiments. A wireless device may receive new data (e.g., uplink data and/or sidelink data). The wireless device may determine whether one or more conditions are satisfied. When the one or more conditions are met, the wireless device may transmit a first SR (e.g., a SL SR or an uplink SR) when a SR timer is not running for a SR configuration via the first SR is transmitted. The wireless device may reset/restart the SR timer in response to the transmitting of the first SR. When the one or more conditions are not met, the wireless device may perform a regular BSR/SR procedure by triggering a BSR for the new data. The regular BSR/SR procedure may be an existing BSR/SR procedure. For example, the wireless device may trigger a BSR for the new data. The wireless device may trigger a second SR in response to the BSR if needed. The wireless device may transmit the BSR via a PUSCH, based on one or more uplink grants. Based on the first SR, a base station may schedule one or more grants (e.g., sidelink grants or uplink grants) comprising resource assignments for the new data. The wireless device, in response to receiving the one or more grants, may cancel one or more pending first SR(s) on the SR configuration. The wireless device may stop the SR timer on the SR configuration.

In an example, a wireless device may trigger a BSR in response to new data is available to a MAC layer and the one or more conditions are not satisfied. The wireless device may trigger a SR without triggering the BSR in response to the new data is available to the MAC layer and the one or more conditions are satisfied. For example, the one or more conditions may comprise that a logical channel of new data is associated with a special SR configuration. For example, the special SR configuration is configured with an option to skip BSR triggering. In response to the one or more conditions are satisfied, the wireless device may trigger the SR, and may restart/reset a SR timer (e.g., sr-ProhibitTimer). The wireless device may transmit the triggered SR based on determining a valid PUCCH for the SR. The wireless device may determine a valid PUCCH for the SR by checking (a)

the valid PUCCH resource for the SR is available; (b) sr-ProhibitTimer or the SR timer is not running at the time of the valid PUCCH resource; (c) the valid PUCCH resource is not overlapping with a measurement gap; (d) the SR is triggered via the special SR configuration or the SR is not associated with the special SR configuration and the valid PUCCH resource is not overlapping with a PUSCH resource (e.g., UL-SCH resource); (e) a number of retransmission for the SR transmission (e.g., SR_COUNTER) is less than an allowed maximum number of retransmission (e.g., sr-Trans-Max). In response to the determining valid PUCCH for the SR, the wireless device transmits the SR via the valid PUCCH resource and increases the SR_COUNTER. The wireless device may reset the sr-ProhibitTimer or the SR timer.

In an example, a wireless device may trigger a sidelink BSR in response to receiving new sidelink data at a MAC layer. The wireless device may trigger a first SR in response to the BSR, when the wireless device may not have a PUSCH suitable for the BSR based on existing procedures. The wireless device in response to one or more cases occurring may also transmit a second SR when the wireless device receives the new sidelink data at the MAC layer. For example, the one or more cases may comprise a first case, where a highest priority of one or more logical channels for the new sidelink data is greater than or equal to a threshold value. In the example, the wireless device may be configured with more than one SR configurations for a logical channel having the highest priority. For example, a first SR configuration may be used for the first SR and a second SR configuration may be used for the second SR. A base station may schedule one or more first DCIs comprising resource assignments for sidelink transmissions in response to receiving the second SR. The base station may utilize one or more UE-assistance information for a sidelink session, where the sidelink session may be associated with the logical channel. The base station may schedule one or more second DCIs comprising resource assignments for uplink transmission for the BSR in response to receiving the first SR. In response to receiving the one or more first DCIs, the wireless device may cancel the second SR.

The wireless device may cancel the first SR when the one or more first DCIs may accommodate all pending sidelink data. In response to receiving the second DCIs, the wireless device may generate a MAC PDU comprising the BSR. The wireless device may cancel the second SR in response to the generating the MAC PDU. The wireless device may cancel the BSR in response to the generating the MAC PDU or transmitting the MAC PDU. In response to being configured with more than one SR configurations for a logical channel, a wireless device may select a SR configuration or a PUCCH resource which is an earliest in timing.

For example, the one or more cases may comprise a second case, where a SR configuration associated with a logical channel of the new sidelink data may be configured with an option to trigger the second SR with and without triggering the first SR. The SR configuration may comprise a first subset SR configuration and a second subset SR configuration. The wireless device may transmit the first SR via the first subset SR configuration of the SR configuration. The wireless device may transmit the second SR via the second subset SR configuration of the SR configuration.

In an example, a wireless device may be configured with a SR configuration. For example, a sr-ProhibitTimer is not configured or the sr-ProhibitTimer is configured with a small value (e.g., 1 slot) for the SR configuration. The wireless device may transmit a first SR and may maintain a pending SR for the first SR. During the first SR is pending of the SR configuration, the wireless device may trigger a second SR and may transmit the second SR as sr-ProhibitTimer may not be running. The SR configuration may be used to transmit one or more SRs whenever a SR is triggered regardless of on-going/pending SRs. The SR configuration may be used for triggering a second SR, which is additionally triggered when the one or more cases occur. The SR configuration may be used to transmit SRs in response to the one or more criteria being met. The SR configuration may be used to transmit SR in response to the one or more conditions being met. With a small/near-zero value of sr-ProhibitTimer may allow back-to-back SR transmissions. The base station may, in response to receiving the back-to-back SR transmissions, schedule one or more DCIs comprising resource assignments for sidelink transmissions. The small/near-zero value of sr-ProhibitTimer may allow one or more sidelink sessions may request resources from the base station. It is more effective, when the wireless device may transmit a SR without triggering a BSR in response to new data being available.

Figure 25:
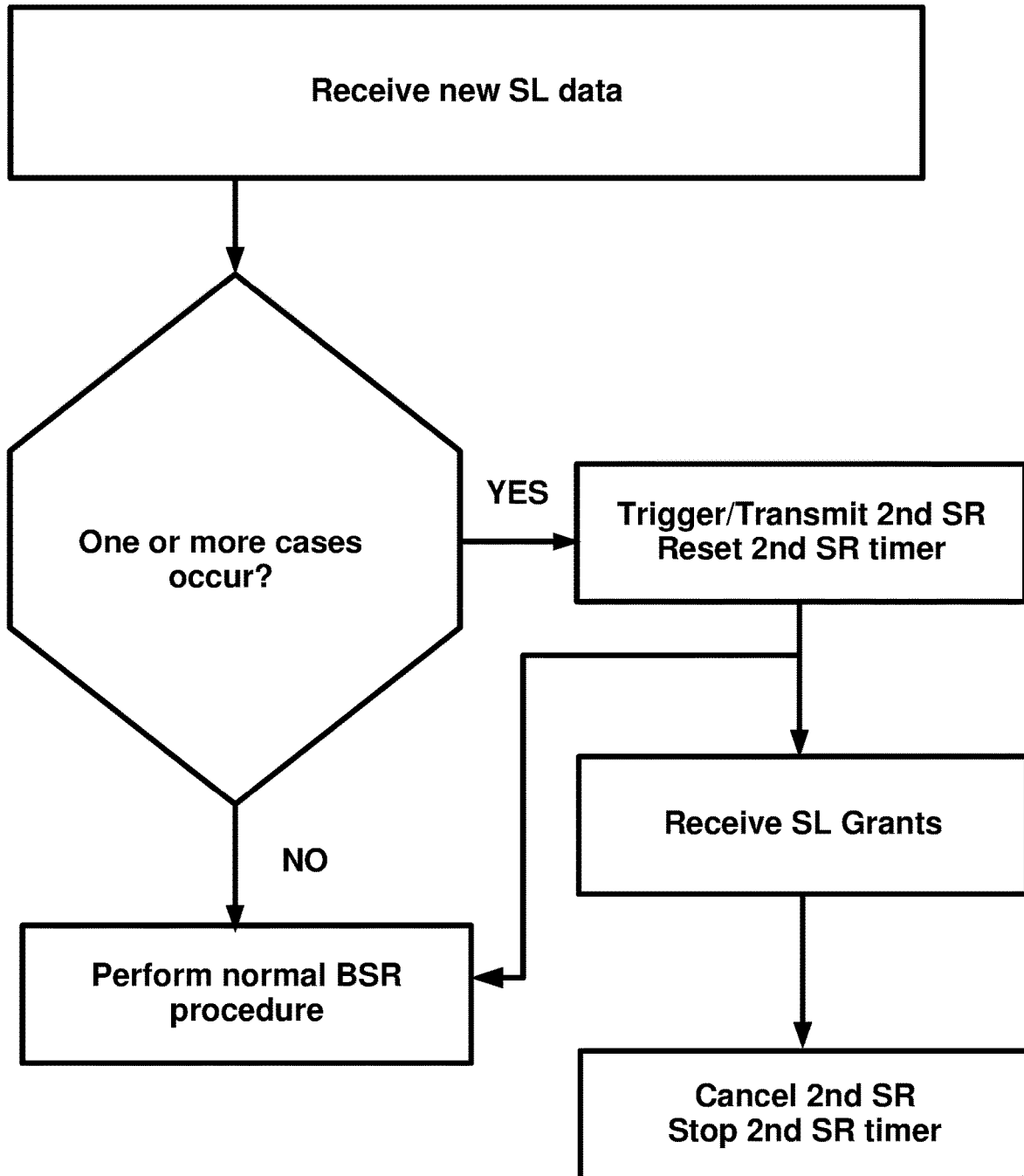
FIG. 25 is an illustration of an aspect of an example embodiment of the present disclosure.

FIG. 25 illustrates an example. A wireless device may have new sidelink data at a MAC layer available. The wireless device may determine whether one or more cases occur. In response to the determining that the one or more cases occur, the wireless device may trigger a second SR via a second SR configuration. The wireless device may trigger a BSR regardless of whether the one or more cases occur. The wireless device may trigger a first SR for BSR. A base station may transmit one or more sidelink grants comprising resource assignments for sidelink transmissions in response to the second SR regardless of whether the base station has received the BSR or not. The wireless device may cancel the second SR in response to receiving the one or more sidelink grants. The base station may schedule one or more uplink grants comprising resource assignments for uplink transmissions in response to the first SR for the BSR. The wireless device may cancel the first SR in response to receiving the one or more uplink grants and/or in response to multiplexing data with the BSR and/or in response to transmitting the BSR and/or in response to transmitting all pending sidelink data. In an example, the wireless device may not have a valid PUCCH resource for the second SR. The wireless device may skip transmitting the second SR and may cancel the second SR in response to the case where no valid PUCCH resource is available for the second SR. The wireless device may continue maintaining other pending SRs. In an example, the wireless device may reach a maximum number of the second SR (re)-transmissions. The wireless device, in response to reaching the maximum number of retransmissions, the wireless device may skip transmitting the second SR and may cancel the second SR in response to the case where the number of retransmissions reaches an allowed maximum number. The wireless device may continue maintaining other pending SRs. The wireless device may cancel the second SR and may stop a SR timer (e.g., sr-Prohibit-Timer).

In an example, a wireless device may trigger a sidelink buffer status reporting (SL BSR) in response to new sidelink data of a logical channel may arrive to a MAC layer of the wireless device. The wireless device may trigger a first scheduling request (SR) based on the triggering of the SL BSR. For example, the wireless device may not identify a PUSCH to carry the SL BSR. For example, if identified, the PUSCH may satisfy a latency requirement of the SL BSR and/or the PUSCH is allowed to transmit the SL BSR and/or the BSR may be multiplexed with a data for the PUSCH.

The wireless device may receive from a base station one or more DCIs comprising resource assignments for sidelink transmissions for the new sidelink data. The wireless device may cancel the first SR in response to the receiving the one or more DCIs. The wireless device may transmit one or more sidelink transport blocks of the new sidelink data (e.g., one or more sidelink transport blocks of the new sidelink data) based on the one or more DCIs. The wireless device may determine whether the one or more sidelink transport blocks comprise the new sidelink data. The wireless device may trigger and transmit a second SR based on the determining. For example, the wireless device may skip triggering/transmitting the second SR in response to no new sidelink data of the logical channel after transmitting the one or more sidelink transport blocks is left. For example, the wireless device may transmit the second SR in response to the remained new sidelink data of the logical channel after transmitting the one or more sidelink transport blocks. For example, the wireless device may trigger/transmit the second SR in response to the pending BSR after the transmitting the one or more sidelink transport blocks.

In an example, a base station may configure a first SR configuration to a logical channel for sidelink data. The base station may configure a second SR configuration to the logical channel for the sidelink data. The logical channel may be associated with a sidelink session and may be configured with a priority. A wireless device may inform/indicate to the base station via a UE-assistance information (e.g., via RRC signaling, MAC CEs, DCIs) on one or more parameters of the sidelink session. The one or more parameters may comprise one or more of a buffer size level, the logical channel index, MCS, a packet size, a destination address, and a periodicity. The buffer status report may indicate an expected buffer status report in response to trigging the SR of the logical channel assuming the logical channel is configured dedicated to the first SR configuration. The wireless device may indicate the expected buffer size level based on one or more logical channels associated with the first SR configuration, when there are more than one logical channels mapped to the first SR configuration.

The wireless device may have new sidelink data available at a MAC layer. The wireless device may trigger a BSR for the new sidelink data. The wireless device may determine a buffer size level of the BSR is lower than or equal to the buffer size level of the one or more parameters of the sidelink session via the UE-assistance information. In response to the determining (e.g., the buffer size level of the BSR is not greater than the reported buffer size level), the wireless device may trigger a first SR via the first SR configuration. The wireless device may cancel the BSR in response to transmitting the first SR. The wireless device may cancel the first SR in response to receiving one or more sidelink DCIs comprising resource assignments for sidelink transmissions. In response to the not-determining (e.g., the buffer size level of the BSR is greater than the reported buffer size level), the wireless device may initiate a normal BSR/SR procedure as the wireless device may need to transmit the BSR to the base station. In an example, the wireless device may trigger a second SR when there is no PUSCH for the BSR. The wireless device may transmit the second SR via the second SR configuration. In an example, the wireless device may trigger the BSR in response to determining that the buffer size level of the BSR is greater than the buffer size level of the one or more parameters of the sidelink session indicated via the UE-assistance information. The wireless device may additionally trigger the first SR in the example. The wireless device may not cancel the BSR and may trigger the second SR if needed. The wireless device may continue BSR procedure and the first SR procedure in parallel.

Figure 26:
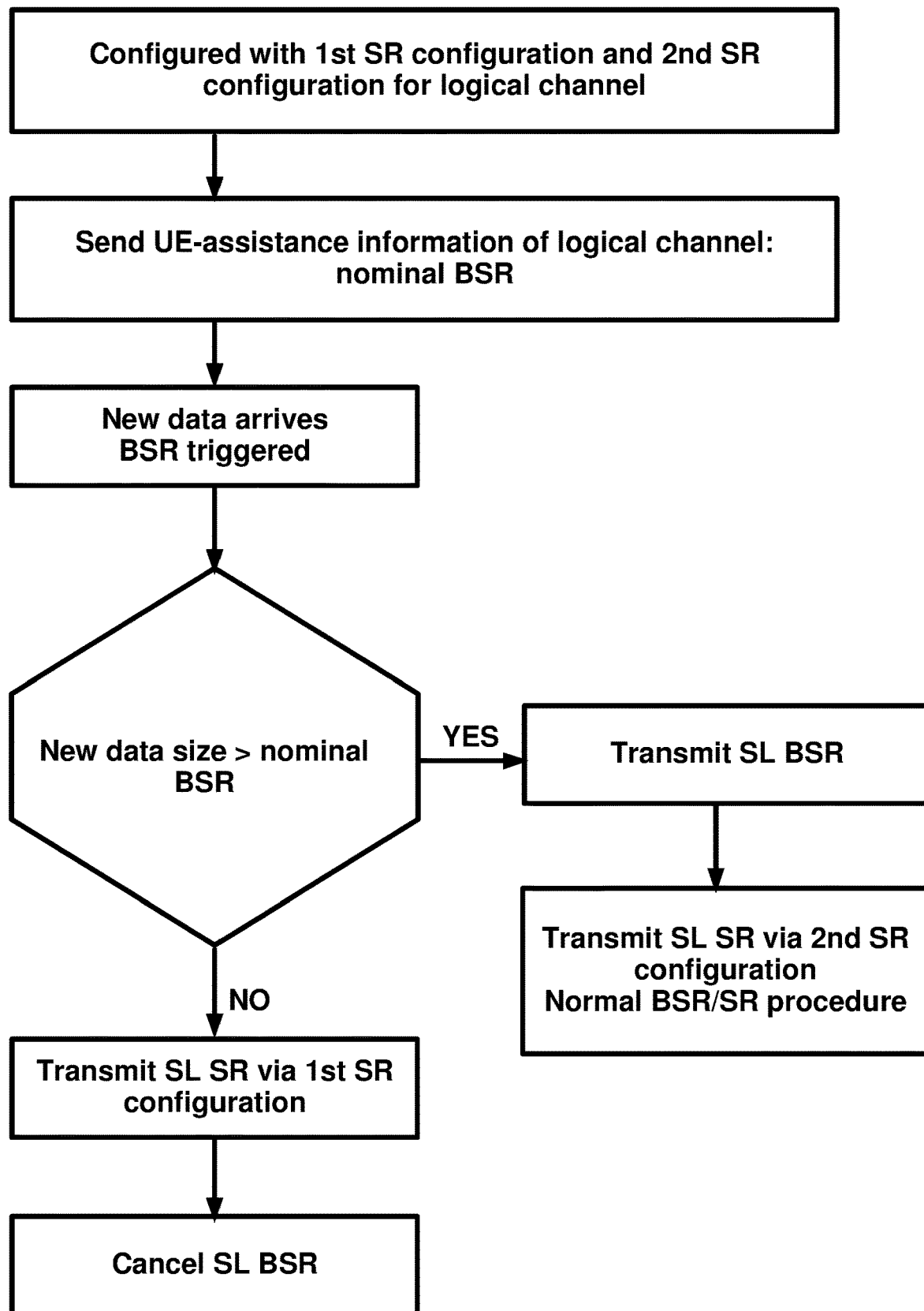
FIG. 26 is an illustration of an aspect of an example embodiment of the present disclosure.

FIG. 26 illustrates an example. A base station may configure a first SR configuration and a second SR configuration mapped to a first logical channel. The base station may further configure a first priority value that may be used for the first SR configuration. When the base station configures the priority value for the first SR configuration, the wireless device may use the first SR configuration only when a new data may comprise data with a priority higher than or equal to the first priority value configured for the first SR configuration and logical channel(s) of the new data are mapped to the first SR configuration (e.g., the logical channel(s) comprise the first logical channel). The wireless device may inform one or more traffic pattern information comprising the first logical channel or a second priority that is higher than or equal to the first priority. The base station may associate the one or more traffic pattern information to the first SR configuration. The wireless device may indicate, via the one or more traffic pattern information, a nominal BSR level of the logical channel or the second priority of a sidelink session.

The wireless device may receive second new data available at a MAC layer. In response to the second new data being available, the wireless device may trigger a BSR for the second new data. The wireless device may determine whether to transmit a first SR via the first SR configuration or a second SR via the second SR configuration based on one or more criteria. For example, the one or more criteria may comprise whether a computed buffer size level of the triggered BSR exceeds the nominal buffer size level indicated via the one or more traffic pattern information. When the computed buffer size level exceeds the indicated buffer size level, the wireless device may not trigger the first SR via the first SR configuration. The wireless device may perform a regular BSR/SR procedure. The wireless device may determine a PUSCH to carry the BSR. When the PUSCH is not available, the wireless device may trigger the second SR and may transmit the second SR via a valid PUCCH resource. When the computed buffer size level is smaller than or equal to the indicated buffer size level, the wireless device may trigger the first SR via the first SR configuration. The wireless device may transmit the first SR via a PUCCH when there is valid PUCCH resource(s) based on the first SR configuration. The wireless device may cancel the triggered BSR in response to the transmitting the first SR.

Figure 27:
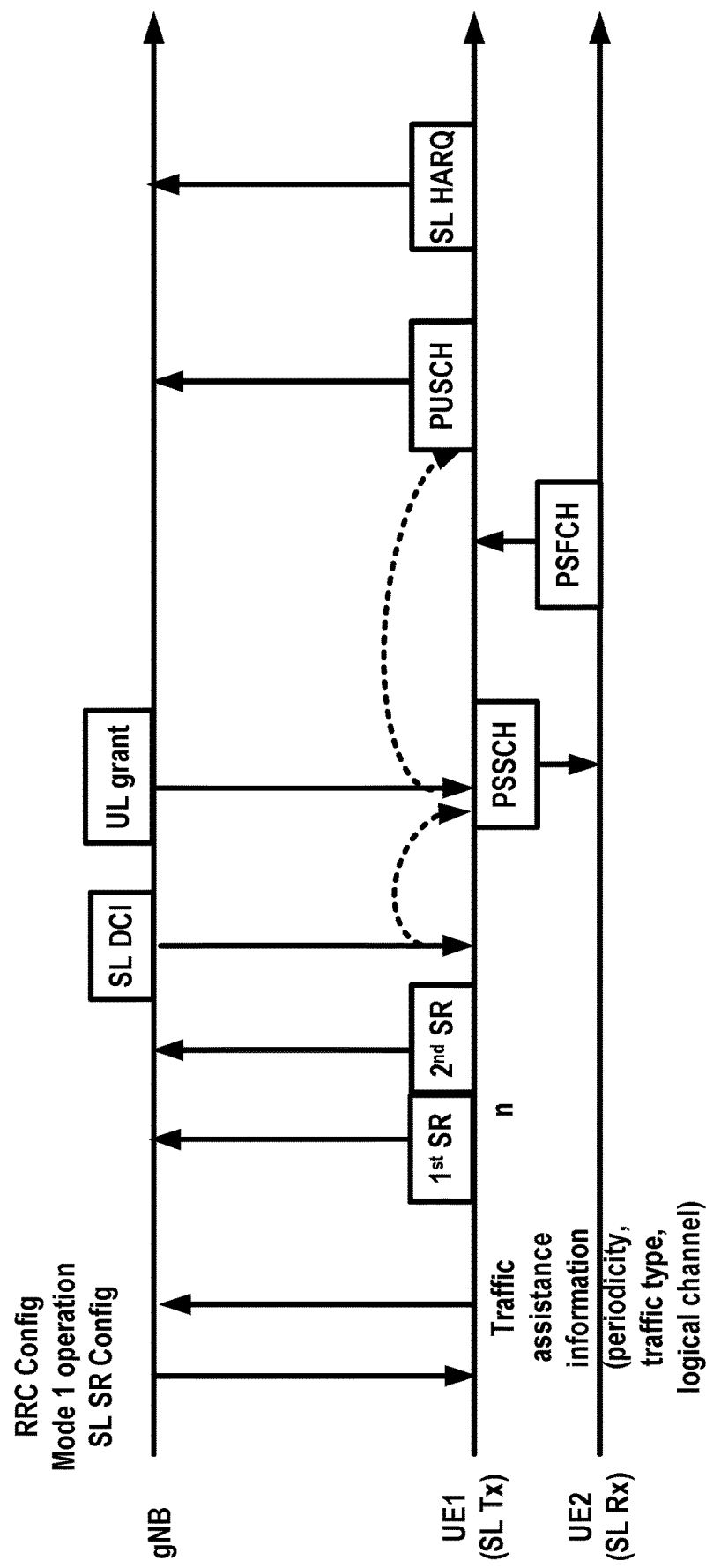
FIG. 27 is an illustration of an aspect of an example embodiment of the present disclosure.

FIG. 27 illustrates a similar example, where the wireless device may perform a BSR procedure and a first SR procedure in parallel. The wireless device may trigger the first SR when the one or more criteria being met. The wireless device may additionally trigger the second SR for the BSR transmission. The base station may schedule one or more sidelink DCIs comprising resource assignments for sidelink transmissions in response to receiving the first SR. The base station may schedule one or more uplink grants comprising resource assignments for PUSCH(s) in response to receiving the second SR. The wireless device may transmit the sidelink transmissions based on the one or more sidelink DCIs. The wireless device may transmit the BSR based on the one or more uplink grants.

Figure 28:
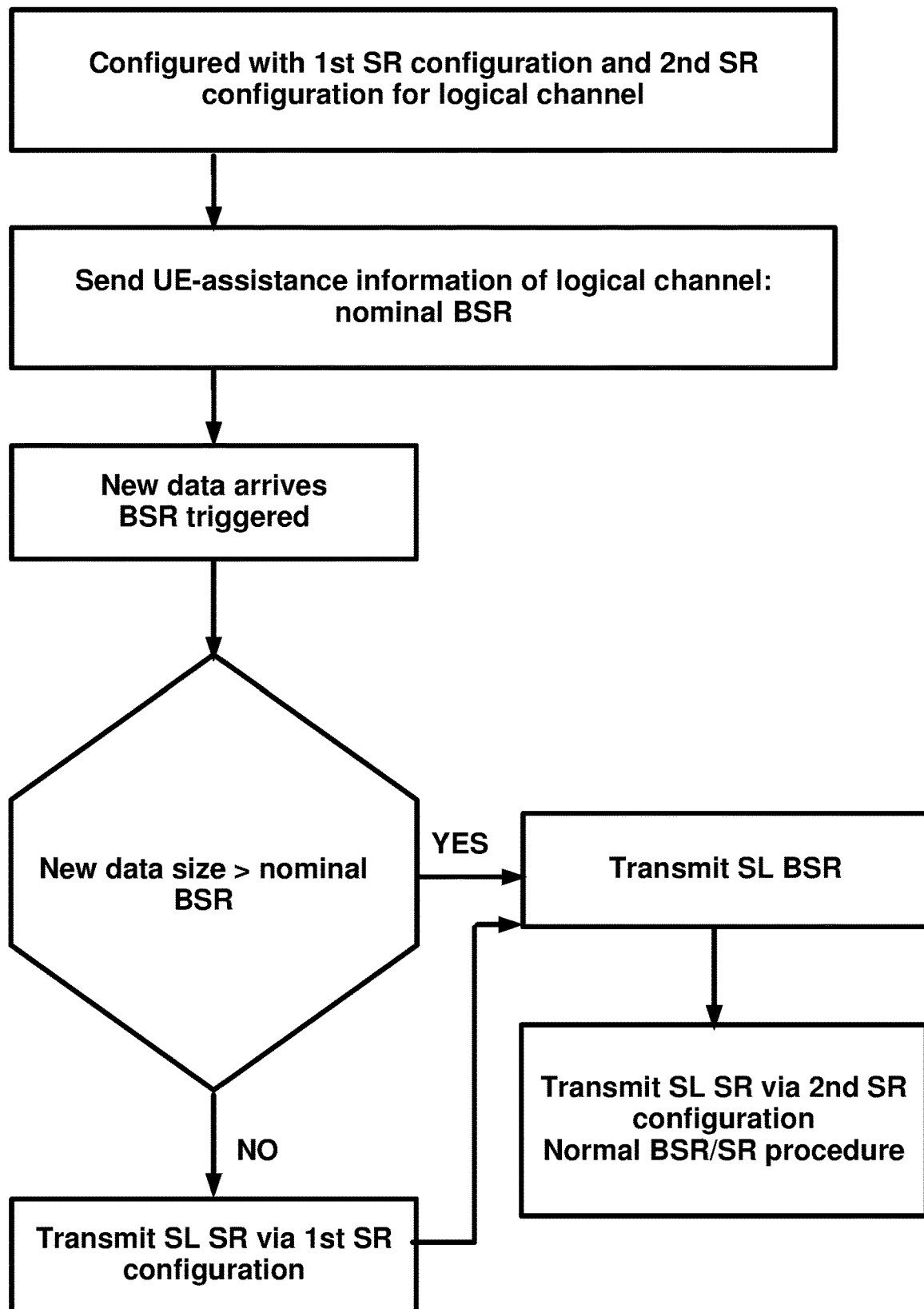
FIG. 28 is an illustration of an aspect of an example embodiment of the present disclosure.

FIG. 28 illustrates a flow diagram of embodiments. FIG. 28 is a similar flow diagram to FIG. 26 with a few differences. For example, the wireless device may trigger the first SR and the second SR in parallel. For example, the wireless device may trigger the first SR and perform a normal BSR/SR procedure in parallel additionally, when the one or more criteria is being met. The wireless device may not cancel the BSR in response to transmitting the first SR, as the wireless device is running the normal BSR/SR procedure in parallel.

In an example, a wireless device may transmit one or more parameters for a sidelink session or for a logical channel via a UE-assistance information. The wireless device may transmit the one or more parameters via one or more RRC messages or MAC CEs or DCIs. The wireless device may send one or more UE-assistance information for one or more sidelink sessions. The one or more parameters of each sidelink session may comprise one or more of the followings. For example, the one or more parameters may comprise a periodicity of data occurrence of the sidelink session (e.g., trafficPeriodicity) and an offset of the data occurrence in an interval based on the periodicity (e.g., timeOffset). The one or more parameters may comprise a priority value and/or a logical channel index/identify (e.g., priorityInfoSL, logicalChannelIdentifyUL). When one or more priorities are mapped to a logical channel with a limited number of logical channels, the wireless device may further indicate a priority value for the logical channel. In terms of a priority of a logical channel, when there are more than one priority mapped to the logical channel, may be determined based on a highest priority of the more than one priorities mapped to the logical channel. The priority of the logical channel may be determined based on a highest priority of data mapped to the logical time at a given time (e.g., data available to a MAC layer may determine the priority). The priority of the logical channel may be determined based on a lowest priority of the one or more priorities. The priority of the logical channel may be determined based on one or more configuration parameters configured by the base station on the logical channel (e.g., a priority value of the logical channel).

For example, the one or more parameters of the sidelink session may comprise a message size where the message size may comprise a size of data at an occurrence. The one or more parameters may comprise a destination identify (e.g., trafficDestination) of the sidelink session (e.g., a destination address for a unicast, a group membership address for a groupcast, a broadcast group or a broadcast identify for a broadcast). The one or more parameters may further comprise one or more quality of service requirements such as latency (e.g., a delay budget) and reliability (e.g., a required number of repetition) requirements (e.g., latencyInfoSL, reliabilityInfoSL). The one or more parameters may further comprise modulation order (e.g., MCS, modulationIndex) for the sidelink session. The one or more parameters may further comprise a nominal buffer size level. For example, the nominal buffer size level may represent an expected buffer size level in response to a SR trigger for the indicated logical channel or for an associated SR configuration. The base station may determine the associated SR configuration based on the logical channel. For example, the wireless device determines the associated SR configuration based on one or more RRC configuration parameters of mapping between each logical channel and each SR configuration. The nominal buffer size level may be assumed to be same as the message size when the nominal buffer size level is not indicated by the wireless device. The base station may determine the nominal buffer size level based on the periodicity, the message size and an interval of the associated SR configuration to the logical channel. For example, the periodicity is 2 msec, and the message size is 200 bytes and the SR configuration periodicity/interval is 10 msec. The base station may determine the nominal buffer size level as the message size*ceil (SR periodicity/the periodicity) (e.g., a number of message occurrences in each SR period or in a delay budget of the logical channel) (e.g., 200 bytes*5=1000 bytes).

For example, the one or more parameters may comprise a traffic type such as aperiodic and periodic. The aperiodic traffic type may refer that the indicated sidelink session may occur aperiodically and may last for a certain duration once started. Indication of periodic or aperiodic of a traffic pattern may be implicitly performed. For example, a periodicity less than a threshold periodicity (e.g., 3 msec), the traffic pattern is considered as aperiodic traffic type. The periodicity is equal to or larger than the threshold periodicity may be considered as periodic. For example, one or more first parameters for aperiodic traffic type for a first sidelink session and one or more second parameters for periodic traffic type for a second sidelink session may be different. For example, the one or more first parameters may comprise a plurality of {a periodicity, a time offset}. For each {a periodicity, a time offset}, a message size may be additionally configured. One aperiodic sidelink session may be represented by a plurality of periodic traffic patterns or a plurality of pairs of periodicity and time offset. For aperiodic traffic pattern, the wireless device may provide a plurality of periodicities where union of the plurality of periodicities may represent a burstiness of the aperiodic traffic pattern. The one or more parameters may further comprise a session duration where the traffic may occur for the session duration in case of the aperiodic traffic type pattern. The base station may configure one or more configured grant resources for one or more first sidelink sessions indicated with periodic traffic type. The base station may not configure configured grant resources for one or more second sidelink sessions indicated with aperiodic traffic type. The base station may configure one or more short interval/periodicity SR configurations for the one or more second sidelink sessions such that the wireless device may inform an occurrence of the data with a lower latency to the base station. The base station may schedule one or more DCIs comprising resource assignments for sidelink transmissions for the one or more second sidelink sessions regardless of whether the base station may have received corresponding BSRs or not. The base station may utilize one or more UE-assistance information on the one or more second sidelink sessions in scheduling the one or more DCIs.

In an example, a wireless device may provide a plurality of nominal buffer size levels for a sidelink session or for a logical channel or for a pair of {a priority, a logical channel index}. The plurality of nominal buffer size levels may be used by a base station to determine resources for sidelink transmissions in response to receiving a SR for the logical channel. The wireless device may further indicate a nominal buffer size level among the plurality of nominal buffer size levels along with the SR transmission. When the wireless device may not indicate the nominal buffer size level, the base station may select one level based on one or more rules. For example, the base station may start from a lowest buffer size level of the plurality of nominal buffer size levels and may increase in response to receiving a SR for the logical channel. The base station may reset to the lowest buffer size level when no SR has been received for the logical channel for more than a certain duration (e.g., inactivity timer). For example, the base station may randomly select a buffer size level among the plurality of buffer size levels. For example, the base station may select a buffer size level based on activities of the sidelink session/logical channel.

In an example, a wireless device may not provide a nominal buffer size level for a sidelink session. A base station, without having a pre-exchanged nominal buffer size level, may schedule one or more uplink grants for PUSCH(s) for receiving a BSR for new sidelink data for the sidelink session. The wireless device may transmit the BSR on the PUSCH(s). In response to receiving the BSR, the base station may use a buffer size level in the BSR as the nominal buffer size level for the sidelink session. The base station may use a most recent buffer size level reported by the wireless device as the nominal buffer size level for the sidelink session or for a logical channel. For example, the wireless device may provide a first nominal buffer size level via a UE-assistance information via RRC signaling. The wireless device may transmit a second BSR based on one or more conditions specified in the specification via MAC CE signaling. The base station may update the nominal buffer size of the sidelink session, or the logical channel based on the second BSR. For example, the second BSR is a most recent buffer size level report from the wireless device. The base station may use the updated nominal buffer size level for scheduling resources for sidelink transmissions when an up-to-date buffer size level report for a triggered SR is not available. The base station may use the up-to-date buffer size level report when available for the scheduling. Whether the base station may update the nominal buffer size level for the sidelink session or not may depend on the base station implementation. The wireless device may indicate a bit in a BSR to inform to the base station whether the BSR represents a nominal buffer size level so that the base station is recommended to update the nominal buffer size level for the logical channel or the sidelink session. The wireless device may indicate otherwise, where the buffer size level of the BSR may not be a typical value of the traffic pattern. This may be indicated via a single bit (e.g., 0 for not recommending the update, 1 for recommending the update) in a BSR MAC CE for each sidelink session or a logical channel or a sidelink traffic.

In an example, a base station may configure one or more parameters of a nominal buffer size level assumption for a SR configuration. The one or more parameters may indicate that the base station may assume the indicated buffer size level for scheduling corresponding logical channel(s) associated with the SR configuration. A wireless device may have new sidelink data available at a MAC layer. The wireless device may trigger a BSR and compute a first buffer size level for the BSR. When a logical channel of the new sidelink data is associated with the SR configuration with the one or more parameters, the wireless device may determine the first buffer size level of the BSR is greater than the nominal buffer size level indicated by the base station. In response to the determining, the wireless device may continue BSR process and may trigger a corresponding SR. The wireless device may determine the first buffer size level is equal to or smaller than the nominal buffer size level. In response to the determining, the wireless device may trigger a SR via the SR configuration. In response to transmitting the SR, the wireless device may cancel the BSR.

In an example, a wireless device may provide a minimum buffer size level for a sidelink session or a logical channel or a pair of {a priority, a logical channel} or for a sidelink traffic. A base station may utilize the minimum buffer size level to schedule one or more DCIs comprising resource assignments for sidelink transmissions before the base station receives a BSR for the sidelink session or the logical channel or the pair of {a priority, a logical channel} or for the sidelink traffic. This may be used to receive by the wireless device minimum amount of data for sidelink transmissions before providing the BSR to the base station. A default value for the minimum buffer size level would be zero, and may be indicated with a non-zero value for low latency high priority sidelink data/logical channels. The base station may schedule uplink grants for the BSR in parallel with the one or more DCIs so that the wireless device may transmit the BSR fast. Based on the updated BSR information, the base station may continue scheduling more DCIs. For example, the minimum buffer size level may be preconfigured/configured by the base station for a sidelink session or a logical channel or a pair of {a priority, a logical channel} or for a sidelink traffic. The wireless device may cancel the BSR when a buffer size level of the BSR is smaller than or equal to the minimum buffer size level of the sidelink session or the logical channel or the pair of {a priority, a logical channel} or for the sidelink traffic. Otherwise, the wireless device may continue a normal BSR/SR procedure.

In an example, when a nominal or minimum buffer size level is associated with a sidelink session, a logical channel, a pair of {a priority, a logical channel}, a sidelink destination index, or a sidelink traffic, the wireless device may trigger a SR when one or more cases. For example, the wireless device may trigger the SR as long as an earliest valid SR occasion for a SR configuration associated with the logical channel comes before a PUSCH. For example, the wireless device may carry the BSR via the PUSCH. For example, the wireless device may trigger the SR when an earliest valid SR occasion for the SR configuration associated with the logical channel occurs within a latency budget or a threshold duration (e.g., within 2 msec). This is to indicate the SR to the base station immediately so that the base station may start scheduling resources based on the nominal or minimum buffer size assumption for the sidelink session.

In an example, a base station may transmit one or more DCIs activating one or more configured grant resources in response to receiving a SR associated with a first logical channel or associated with a first sidelink session. This may be useful for periodic sidelink sessions or periodic sidelink traffic pattern. The base station may preconfigure one or more semi-persistent, periodic or configured grant resources for periodic sidelink traffic pattern based on UE-assistance information. The base station may activate in response to receiving the SR associated with the sidelink traffic pattern.

FIG. 29 illustrates an example of the one or more parameters via RRC signaling mechanism. A similar mechanism and/or a similar set of parameters may be also applied/transmitted to MAC CE signaling based or DCI signaling based. For example, a wireless device may send one or more traffic pattern information via one or more UE-assistance information RRC messages. For example, a traffic pattern information may comprise one or more parameters of a sidelink session or a sidelink traffic. The one or more parameters of the traffic pattern information may comprise one or more of a periodicity, a time offset, a priority value, a logical channel index, a message size, a traffic destination identify, a reliability information/requirement, a latency information/requirement, a MCS (e.g., modulation index), a nominal buffer size level, a traffic type, a cast type, and/or the like. The one or more parameters of the traffic information may be different based on a cast type (e.g., a unicast, groupcast, broadcast) or may be different based on a traffic type (e.g., aperiodic or periodic). For example, a broadcast type data may not require a HARQ feedback from one or more receiver UEs. For groupcast and/or unicast, the wireless device may indicate whether the wireless device may like to enable HARQ feedback from one or more receiver UEs via the one or more parameters of the sidelink session. The base station, based on the information, may schedule one or more sidelink DCIs comprising resource assignments for one or more sidelink control channels (PSCCHs), one or more sidelink data channels (PSSCHs), one or more sidelink feedback channels (PSFCHs), and/or one or more HARQ-ACK feedbacks (PUCCHs) to the base station. The wireless device may indicate 'HARQ-ACK' enabled/disabled for a unicast and/or a groupcast sidelink session such that the base station may assign appropriate resources.

For example, the wireless device may inform, via a UE-assistance information indication, a first set of traffic pattern information for a periodic sidelink session. For example, the first set of traffic pattern information may comprise a periodicity, a time offset and a message size. The first set of traffic pattern information may further comprise a starting time or a delay to start the session (e.g., a time duration until the session may become active). The wireless device may inform, via the UE-assistance information indication, a second set of traffic pattern information. For example, the second set of traffic information may comprise a mean/average periodicity, a (standard) deviation of the periodicity, a mean/average message size, a (standard) deviation of the message size, and a time offset. The aperiodic traffic type may produce data in a burst manner. The wireless device may indicate a potential burstiness information via indicating an average/mean value of periodicity/message size and deviation values of the periodicity/message. The second set of traffic information may comprise a starting time and/or a duration of the session being active.

In an example, the wireless device may indicate a preference of configuration of one or more configured grants for a sidelink session via the UE-assistance information. For example, the wireless device may inform a parameter such as request for configured grant. For example, the parameter may indicate a preference of the wireless device in terms of being configured with configured grant resources for the corresponding sidelink link session or corresponding traffic pattern. The wireless device may indicate the preference of the configured grant resource for one or more periodic traffic patterns/sidelink sessions.

In an example, a base station may configure one or more configured grant resources (e.g., semi-persistent uplink resources) for a logical channel of a sidelink data, based on a UE-assistance information. The one or more configured grant resources are used for sidelink transmissions. A wireless device may provide one or more parameters of the logical channel of the sidelink data. The one or more parameters may comprise a periodicity of a traffic pattern, a time offset, a message size and the logical channel index (and/or a priority). The wireless device may provide the one or more parameters of the logical channel of the sidelink data, where the sidelink data may not occur periodic manner. For example, a size of data may change over a time depending on scenarios, which may be larger or smaller than the message size in different times. For example, the periodicity may change to be shorter or longer. The one or more parameters may represent average or mean parameters of the traffic pattern for the sidelink data.

The one or more configured grant resources may be configured based on the one or more parameters. For example, the one or more configured grant resources may be enough or may not be sufficient depending on actual new data size occurring. For example, the base station allows to multiplex new sidelink data of the logical channel and be transmitted via the one or more configured grant resources based on mapping between logical channels and configured grant resources. The wireless device may have new first sidelink data available at a MAC layer. The wireless device may trigger a sidelink BSR in response to one or more events occurring. For example, the one or more events may comprise a first case where a next valid configured grant resource of the one or more configured grant resources may not occur in a delay budget of the logical channel or the new sidelink data (e.g., 3 msec for platooning). In the first case, the wireless device may not be able to use the next valid configured grant resource due to a latency and/or reliability (e.g., a number of slots/repetitions configured for the next valid configured grant resource). For example, the latency is not satisfying a required latency requirement of the logical channel and/or the reliability or required repetition may not be sufficient compared to a required repetition number of the logical channel. The wireless device may determine the next valid configured grant resource which is an earliest configured gran resource for sidelink transmissions allowed to be used for the logical channel. The one or more events may comprise a second case where the wireless device may identify valid configured grant resource(s) for the new sidelink data with satisfying the latency and the reliability requirement of the logical channel and the valid configured grant resource(s) may not accommodate all the new sidelink data (and thus may have a left data after transmitting sidelink transport blocks via the valid configured grant resource(s)).

For example, for the second case, the wireless device may trigger a sidelink BSR based on a short-periodic-sidelink-BSR-Timer (e.g., short-periodic-BSR-TimerSL). The wireless device may start the short-periodic-BSR-TimerSL in response to having the new sidelink data available at the MAC layer or in response to transmitting sidelink transmissions via the valid configured grant resource(s). In an expiry of the short-periodic-BSR-TimerSL, the wireless device may trigger the sidelink BSR if there is no pending sidelink BSR and the wireless device may stop the short-periodic-BSR-TimerSL. The wireless device may stop the short-periodic-BSR-TimerSL in response to triggering a sidelink BSR for the new sidelink data (e.g., regular-BSR-SL, padding-BSR-SL, periodic-BSR-SL, retx-BSR-SL).

For example, for the second case, the wireless device may trigger a sidelink BSR in response to having new sidelink data available at the MAC layer. The wireless device may compute a first buffer size level of the logical channel. The wireless device may compute an aggregated message size based on the one or more configured grants where the aggregated message size may comprise a message size of a configured grant resource and a number of occasions of the one or more configured grants within a delay budget (e.g., the message size is 100 bytes and three occasions within 20 msec becomes 300 bytes aggregated message size). For a low latency, a single occasion may be assumed and the aggregated message size may be the message size of each configured grant resource. The wireless device may compare the first buffer size level and the aggregated message size. In response to the first buffer size is smaller than or equal to the aggregated message size, the wireless device may cancel the sidelink BSR and transmit one or more first sidelink transport blocks of the new sidelink data via the configured grant resource(s). In response to the first buffer size is larger than the aggregated message size, the wireless device may proceed with the sidelink BSR. The wireless device may transmit one or more second sidelink transport blocks of the new sidelink data via the configured grant resource(s). For example, the one or more second sidelink transport blocks may not comprise the entire new sidelink data.

For example, for the second case, the wireless device may trigger blindly (e.g., without considering one or more conditions) a sidelink BSR in response to having new sidelink data of the logical channel available at the MAC layer. The base station may configure a blind sidelink BSR triggering option for one or more logical channels. For the logical channel belonging to the one or ore logical channels, the wireless device may trigger the sidelink BSR in response to having the new sidelink data being available at the MAC layer. This sidelink BSR may be called as a blind-BSR-SL. The wireless device may handle the blind-BSR-SL in a similar manner to handle a periodic-BSR-SL. The sidelink BSR may be cancelled in response to transmitting the new sidelink data via one or more sidelink transmissions.

For example, for the second case, the wireless device may trigger a sidelink BSR in response to new sidelink data being available to the MAC layer. The wireless device may compute a buffer size level for the sidelink BSR in consideration of one or more sidelink transport blocks transmitted via the valid configured grant resource(s). The wireless device may cancel the sidelink BSR in response to the buffer size level becomes zero or very negligible. The wireless device may not trigger or may cancel a triggered SR in response to the buffer size level becomes zero or very negligible. For example, for the second case, the wireless device may provide the message size of the logical channel via the UE-assistance information. The wireless device may trigger a sidelink BSR in response to the message size via the UE-assistance information is smaller than a size of the new sidelink data of the logical channel. For example, for the second case, the base station may provide a message size of the one or more configured grant resource(s). The wireless device may trigger a sidelink BSR in response to the message size of the configured grant resource(s) is smaller than a size of the new sidelink data of the logical channel.

The one or more events may comprise a third case where the logical channel may not be associated or mapped to any configured grant resource for sidelink transmission. This may address aperiodic traffic pattern mapped to the logical channel, where the wireless device and the base station may interactively schedule resources based on real-time traffic demands. For example, when the logical channel may be associated or mapped to one or more configured grant resources for sidelink transmission, the wireless device may not trigger a BSR for the logical channel. The wireless device may utilize the one or more configured grant resources for the logical channel. The wireless device may send updated UE-assistance information on the logical channel in response to identifying the one or more configured grant resources may not be enough for the logical channel. The wireless device may consider this behavior only for activated configured grant resources. A configured grant resource configured but not being activated may not be considered for the third case.

In an example, a configured grant resource for sidelink transmission may be mapped to a logical channel and/or a sidelink session. The configured grant resource may not be shared among a plurality of logical channels and/or sidelink destinations and/or sidelink sessions.

Embodiments are described mainly focused on a sidelink operation and sidelink new data. It is noted that embodiments may be also applied to an uplink operation and uplink new data. Embodiments may be applied to a mixed data of uplink and sidelink data.

In an example, a wireless device may trigger a sidelink buffer status reporting (SL BSR) in response to new sidelink data of a logical channel may arrive to a MAC layer of the wireless device. The wireless device may trigger a scheduling request (SR) based on the triggering of the SL BSR. For example, the wireless device may not identify a PUSCH to carry the SL BSR. For example, if identified, the PUSCH may satisfy a latency requirement of the SL BSR and/or the PUSCH is allowed to transmit the SL BSR and/or the BSR may be multiplexed with a data for the PUSCH. The wireless device may receive from a base station one or more DCIs comprising resource assignments for sidelink transmissions for the new sidelink data. In response to the receiving the one or more DCIs, the wireless device may cancel the SR. The wireless device may maintain the pending BSR. The wireless device may cancel the BSR in response to transmitting the BSR or in response to multiplexing the BSR to a data for a PUSCH or in response to identifying no pending sidelink data is available for the logical channel or for a SR configuration mapped to the logical channel. The wireless device may transmit one or more sidelink transport blocks of the new sidelink data based on the one or more DCIs (e.g., sidelink scheduling DCIs).

The wireless device may cancel the SR in response to the receiving the one or more DCIs and one or more criteria are being met. The one or more criteria may comprise a first case where a priority of the logical channel (e.g., the priority of the new sidelink data, the highest priority of the logical channel, the priority configured by the base station to the wireless device for the logical channel) is greater than or equal to a threshold. The one or more criteria may comprise that a SR configuration (e.g., PUCCH resources or PUCCH resource set for the SR configuration) used for the triggered SR may be configured by the base station with one or more parameters enabling the cancelling the SR in response to receiving the one or more DCIs comprising resource assignments for sidelink transmissions. The one or more criteria may comprise that the logical channel is configured with one or more parameters enabling the cancelling the SR in response to receiving the one or more DCIs comprising resource assignments for sidelink transmissions.

The wireless device may start/restart a retransmission timer (e.g., a SR-retx-timer) for a SR retransmission in response to the cancelling the sidelink scheduling request. The wireless device may have a pending BSR for the SR configuration used for the SR transmission. The wireless device may stop the retransmission timer (e.g., the SR-retx-timer) in response to receiving one or more uplink grants scheduling PUSCH(s). The wireless device may carry the SL BSR via the PUSCH(s). The wireless device may retransmit the SR in response to an expiry of the retransmission timer (e.g., the SR-retx-timer) and the SL BSR is pending. The wireless device may stop the retransmission timer in response to the cancelling the SL BSR.

The wireless device may continue a prohibit timer for the SR configuration (e.g., sr-ProhibitTimer) in response to the cancelling the SR. The wireless device may stop the sr-ProhibitTimer in response to receiving the one or more uplink grants scheduling the PUSCH(s). For example, the wireless device may carry the SL BSR via the PUSCH(s).

In an example, the wireless device may indicate to the base station one or more parameters for the new sidelink data of the logical channel. The one or more parameters may comprise a periodicity, a time offset, a message size, a priority and the logical channel index. The one or more parameters may further comprise a buffer size level. For example, the indicated buffer size level may be used by the base station to schedule the one or more DCIs in response to receiving the SR without receiving the BSR. The wireless device may cancel the BSR in response to the indicated buffer size level via the one or more parameters may be larger than or equal to a buffer size level computed for the BSR and in response to receiving the one or more DCIs.

In an example, the wireless device may cancel the BSR in response to the transmitting the SR and one or more conditions being met. The one or more conditions may comprise that the wireless device may provide the one or more parameters for the logical channel to the base station. The one or more conditions may comprise the indicated buffer size level is sufficient to accommodate the new sidelink data.

In an example, the wireless device may further trigger a second SR in response to the pending BSR. The wireless device may keep the second SR in response to the receiving the one or more DCIs.

In an example, a wireless device may trigger a sidelink buffer status reporting (SL BSR) in response to new sidelink data of a logical channel may arrive to a MAC layer of the wireless device. The wireless device may trigger a scheduling request (SR) based on the triggering of the SL BSR. For example, the wireless device may not identify a PUSCH to carry the SL BSR. For example, if identified, the PUSCH may satisfy a latency requirement of the SL BSR and/or the PUSCH is allowed to transmit the SL BSR and/or the BSR may be multiplexed with a data for the PUSCH. The wireless device may receive from a base station one or more DCIs comprising resource assignments for sidelink transmissions for the new sidelink data. In response to the receiving the one or more DCIs and one or more criteria being met, the wireless device may cancel the SR. The wireless device may maintain the pending BSR. The wireless device may cancel the BSR in response to transmitting the BSR or in response to multiplexing the BSR to a data for a PUSCH or in response to identifying no pending sidelink data is available for the logical channel or for a SR configuration mapped to the logical channel. The wireless device may transmit one or more sidelink transport blocks of the new sidelink data based on the one or more DCIs (e.g., sidelink scheduling DCIs).

The one or more criteria may comprise a first case where a priority of the logical channel (e.g., the priority of the new sidelink data, the highest priority of the logical channel, the priority configured by the base station to the wireless device for the logical channel) is greater than or equal to a threshold. The one or more criteria may comprise that a SR configuration (e.g., PUCCH resources or PUCCH resource set for the SR configuration) used for the triggered SR may be configured by the base station with one or more parameters enabling the cancelling the SR in response to receiving the one or more DCIs comprising resource assignments for sidelink transmissions. The one or more criteria may comprise that the logical channel is configured with one or more parameters enabling the cancelling the SR in response to receiving the one or more DCIs comprising resource assignments for sidelink transmissions.

In an example, a wireless device may trigger a scheduling request (SR) in response to new sidelink data of a logical channel arrives. The wireless device may receive from a base station one or more DCIs comprising resource assignments for sidelink transmissions. The wireless device may cancel the SR in response to the receiving the one or more DCIs. The wireless device may transmit one or more sidelink transport blocks of the new sidelink data based on the one or more DCIs.

In an example, a wireless device may trigger a sidelink buffer status reporting (SL BSR) in response to new sidelink data of a logical channel may arrive to a MAC layer of the wireless device. The wireless device may trigger a first scheduling request (SR) based on the triggering of the SL BSR. For example, the wireless device may not identify a PUSCH to carry the SL BSR. For example, if identified, the PUSCH may satisfy a latency requirement of the SL BSR and/or the PUSCH is allowed to transmit the SL BSR and/or the BSR may be multiplexed with a data for the PUSCH. The wireless device may receive from a base station one or more DCIs comprising resource assignments for sidelink transmissions for the new sidelink data. The wireless device may cancel the first SR in response to the receiving the one or more DCIs. The wireless device may transmit one or more sidelink transport blocks of the new sidelink data based on the one or more DCIs. The wireless device may determine whether the one or more sidelink transport blocks comprise the new sidelink data. The wireless device may trigger and transmit a second SR based on the determining. For example, the wireless device may skip triggering/transmitting the second SR in response to no new sidelink data of the logical channel after transmitting the one or more sidelink transport blocks is left. For example, the wireless device may transmit the second SR in response to the remained new sidelink data of the logical channel after transmitting the one or more sidelink transport blocks. For example, the wireless device may trigger/transmit the second SR in response to the pending BSR after the transmitting the one or more sidelink transport blocks.

In an example, a wireless device may transmit one or more parameters of a traffic pattern. For example, the one or more parameters may comprise a traffic type and a logical channel. When the traffic type is aperiodic for the logical channel, the one or more parameters may comprise a first buffer size level. The wireless device may trigger a BSR and compute a second buffer size level in response to new sidelink data of the logical channel being available. The wireless device may transmit a SR for the BSR. The wireless device may receive one or more DCIs comprising resource assignments for sidelink transmissions for the new sidelink data. The wireless device may determine that the first buffer size level being larger than the second buffer size level. Based on the determining, the wireless device may cancel the BSR. Otherwise, the wireless device may continue the BSR process. The wireless device may transmit one or more sidelink transport blocks of the new sidelink data based on the one or more sidelink scheduling DCIs.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 30 is a flow diagram as per an aspect of an example embodiment of the present disclosure. At 3010, a wireless device may transmit one or more radio resource control (RRC) messages indicating assistance information for a sidelink operation. The assistance information may indicate an identifier indicating a logical channel associated with a sidelink traffic and one or more periodicities associated with the logical channel. At 3020, in response to the assistance information, a wireless device may receive one or more second RRC messages. The one or more second RRC messages may indicate one or more configured grant configurations determined based on the one or more of periodicities of the logical channel. At 3030, the wireless device may trigger a transmission of a buffer status report in response to sidelink data of the logical channel becoming available. The wireless device may transmit a scheduling request (SR). At 3040, in response to the SR, the wireless device may cancel the transmission of the buffer status report and may receive one or more activation commands indicating activation of the one or more configured grant configurations.

According to an example embodiment, the cancelling the transmission of the buffer status report may be based on a condition being met. For example, the condition may be met when a priority associated with the logical channel is higher than or equal to a threshold. For example, the condition may be met when a SR configuration associated with the logical channel is configured to skip a buffer status reporting. According to an example embodiment, the wireless device may receive one or more third RRC messages comprising a SR configuration associated with the logical channel and a second logical channel. For example, the wireless device may trigger a second SR based on data becoming available for the second logical channel. For example, the wireless device may cancel the SR in response to the receiving the one or more activation commands. The wireless device may not cancel the second SR in response to the receiving the one or more activation commands. The wireless device may keep the second SR in response to the receiving the one or more activation commands.

According to an example embodiment, the assistance information further may comprise a buffer size level of the logical channel. For example, the buffer size level may indicate a nominal buffer status level associated with the logical channel. For example, the cancelling the transmission of the buffer status report may be in response to the SR and a buffer status level with the sidelink data being equal or smaller than the buffer size level indicated by the assistance information. For example, the wireless device may trigger a second transmission of a second buffer status report in response to a buffer status level with the sidelink data being greater than the buffer size level and cancelling the transmission of the buffer status report.

According to an example embodiment, the wireless device may transmit one or more sidelink transmissions of the sidelink data via one or more sidelink resources of the one or more configured grant configurations. The wireless device may cancel the SR in response to the transmitting the one or more sidelink transmissions. The wireless device may keep the second SR in response to the receiving the one or more activation commands.

According to an example embodiment, the second logical channel may be for uplink data. According to an example embodiment, the assistance information may further indicate a time offset, a message size, and a priority associated with the logical channel. According to an example embodiment, the wireless device may (re)start a SR-retx-tier in response to the cancelling the SR. The wireless device may retransmit the SR in response to an expiry of the SR-retx-timer.

In an example, a wireless device may transmit one or more radio resource control (RRC) messages indicating assistance information for a sidelink operation. For example, the assistant information comprises an identifier indicating a logical channel associated with a sidelink traffic and a plurality of periodicities associated with the logical channel. In response to the assistance information, the wireless device may receive one or more second RRC messages. The one or more RRC messages may indicate one or more configured grant configurations determined based on the plurality of periodicities of the logical channel. The wireless device may trigger a scheduling request based on sidelink data of the logical channel becoming available. The wireless device may receive one or more activation commands indicating activation of the one or more configured grant configurations.

According to an example embodiment, the wireless device may skip triggering a transmission of a buffer status report in response to the sidelink data of the logical channel becoming available and a condition being met. For example, the condition may be met when a priority associated with the logical channel is higher than or equal to a threshold. For example, the condition may be met when the condition is met when a SR configuration associated with the logical channel is configured to skip a buffer status reporting.

In an example, a wireless device may trigger a sidelink buffer status report in response to new sidelink data of a logical channel arrives. The wireless device may trigger a scheduling request based on the triggering of the sidelink buffer status report. The wireless device may receive, from a base station, one or more DCIs comprising resource assignments for sidelink transmissions. The wireless device may cancel the scheduling request in response to the receiving the one or more DCIs and one or more criteria being met. The wireless device may transmit one or more sidelink transport blocks of the new sidelink data based on the one or more sidelink scheduling DCIs.

In an example, a wireless device may trigger a sidelink buffer status report in response to new sidelink data of a logical channel arrives. The wireless device may trigger a first scheduling request based on the triggering of the sidelink buffer status report. The wireless device may receive, from a base station, one or more DCIs comprising resource assignments for sidelink transmissions. The wireless device may cancel the sidelink scheduling request in response to the receiving the one or more DCIs. The wireless device may transmit one or more sidelink transport blocks of the new sidelink data based on the one or more sidelink scheduling DCIs. The wireless device may determine whether the one or more sidelink transport blocks comprise the new sidelink data. The wireless device may transmit a second scheduling request based on the determining.

The invention claimed is:

1. A method, comprising:
   receiving one or more first radio resource control (RRC) messages indicating assistance information, wherein the assistance information indicates:
   an identifier indicating a logical channel; and
   one or more periodicities associated with the logical channel; and
   transmitting in response to the assistance information, one or more second RRC messages indicating one or more configured grant configurations.

2. The method of claim 1, further comprising configuring one or more configured grant configurations in response to the assistance information.

3. The method of claim 1, further comprising one or more of:
   activating one or more grant configurations associated with the logical channel; and
   deactivating one or more grant configurations associated with the logical channel.

4. The method of claim 1, wherein a buffer status report from a wireless device is triggered in response to data of the logical channel becoming available.

5. The method of claim 4, wherein the buffer status report is canceled based on one or more of:
   one or more activation commands indicating activation of the one or more configured grant configurations, a priority associated with the logical channel being greater than or equal to a threshold, and a scheduling request (SR) configuration associated with the logical channel being configured to skip a buffer status reporting.

6. The method of claim 4, wherein the assistance information further comprises a buffer size level of the logical channel.

7. The method of claim 6, wherein the buffer size level indicates a nominal buffer status level associated with the logical channel and canceling the buffer status report is in response to a buffer status level with data being equal or smaller than the buffer size level indicated by the assistance information.

8. A base station, comprising:
one or more processors; and
a memory coupled to the one or more processors and storing instructions that, when executed by the one or more processors, cause the base station to:
receive, from a wireless device, one or more first radio resource control (RRC) messages indicating assistance information, wherein the assistance information indicates:
an identifier indicating a logical channel; and
one or more periodicities associated with the logical channel; and
transmit, to the wireless device, in response to the assistance information, one or more second RRC messages indicating one or more configured grant configurations.

9. The base station of claim 8, wherein the instructions, when executed by the one or more processors, further cause the base station to configure one or more configured grant configurations in response to the assistance information.

10. The base station of claim 8, wherein the instructions, when executed by the one or more processors, further cause the base station to perform one or more of:
activating one or more grant configurations associated with the logical channel; and
deactivating one or more grant configurations associated with the logical channel.

11. The base station of claim 8, wherein a buffer status report from the wireless device is triggered in response to data of the logical channel becoming available.

12. The base station of claim 11, wherein the buffer status report is canceled based on one or more of:
one or more activation commands indicating activation of the one or more configured grant configurations,
a priority associated with the logical channel being greater than or equal to a threshold, and
a scheduling request (SR) configuration associated with the logical channel being configured to skip a buffer status reporting.

13. The base station of claim 11, wherein the assistance information further comprises a buffer size level of the logical channel.

14. The base station of claim 13, wherein the buffer size level indicates a nominal buffer status level associated with the logical channel and canceling the buffer status report is in response to a buffer status level with data being equal or smaller than the buffer size level indicated by the assistance information.

15. A non-transitory computer-readable medium comprising instructions that, when executed by one or more processors of a base station, cause the base station to:
receive, from a wireless device, one or more first radio resource control (RRC) messages indicating assistance information, wherein the assistance information indicates:
an identifier indicating a logical channel; and
one or more periodicities associated with the logical channel; and
transmit, to the wireless device, in response to the assistance information, one or more second RRC messages indicating one or more configured grant configurations.

16. The non-transitory computer-readable medium of claim 15, wherein the instructions, when executed by the one or more processors, further cause the base station to configure one or more configured grant configurations in response to the assistance information.

17. The non-transitory computer-readable medium of claim 15, wherein the instructions, when executed by the one or more processors, further cause the base station to perform one or more of:
activating one or more grant configurations associated with the logical channel; and
deactivating one or more grant configurations associated with the logical channel.

18. The non-transitory computer-readable medium of claim 15, wherein a buffer status report from the wireless device is triggered in response to data of the logical channel becoming available.

19. The non-transitory computer-readable medium of claim 18, wherein the buffer status report is canceled based on one or more of:
one or more activation commands indicating activation of the one or more configured grant configurations,
a priority associated with the logical channel being greater than or equal to a threshold, and
a scheduling request (SR) configuration associated with the logical channel being configured to skip a buffer status reporting.

20. The non-transitory computer-readable medium of claim 19, wherein the assistance information further comprises a buffer size level of the logical channel and canceling the buffer status report is in response to a buffer status level with data being equal or smaller than the buffer size level indicated by the assistance information.

* * * * *

UNITED STATES PATENT AND TRADEMARK OFFICE
CERTIFICATE OF CORRECTION

| | | |
|---|---|---|
| PATENT NO. | : 12,284,549 B2 | Page 1 of 1 |
| APPLICATION NO. | : 18/500323 | |
| DATED | : April 22, 2025 | |
| INVENTOR(S) | : Yunjung Yi et al. | |

It is certified that error appears in the above-identified patent and that said Letters Patent is hereby corrected as shown below:

On the Title Page

(71) Applicant:
Honor Device Co., Ltd., Guangdong (CN)
Should read:
Honor Device Co., Ltd., Shenzhen (CN)

Signed and Sealed this
Twentieth Day of May, 2025

Coke Morgan Stewart
*Acting Director of the United States Patent and Trademark Office*